US012581545B2

(12) United States Patent
Arunachalam et al.

(10) Patent No.: US 12,581,545 B2
(45) Date of Patent: Mar. 17, 2026

(54) SESSION MANAGEMENT FUNCTION SELECTION AND BLOCKING

(71) Applicant: T-Mobile USA, Inc., Bellevue, WA (US)

(72) Inventors: Kameswaran Arunachalam, Redmond, WA (US); Praveen Singaram Muthukumar, Lawrenceville, NJ (US); Kunal Prakash Barawkar, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 379 days.

(21) Appl. No.: 18/130,535

(22) Filed: Apr. 4, 2023

(65) Prior Publication Data

US 2024/0340976 A1     Oct. 10, 2024

(51) Int. Cl.
*H04W 76/10*          (2018.01)
(52) U.S. Cl.
CPC ................................... *H04W 76/10* (2018.02)
(58) Field of Classification Search
CPC .... H04W 76/10; H04W 76/12; H04W 80/045
See application file for complete search history.

(56) References Cited

U.S. PATENT DOCUMENTS

| 11,039,381 | B2 * | 6/2021 | Mas Rosique | ........ | H04W 48/18 |
| 2020/0366642 | A1 * | 11/2020 | Zong | ...................... | H04L 61/00 |
| 2022/0030071 | A1 * | 1/2022 | Afzal | ................... | H04W 76/12 |
| 2022/0030645 | A1 * | 1/2022 | Afzal | ................... | H04W 76/12 |
| 2022/0417839 | A1 * | 12/2022 | Buyukdura | ........... | H04W 76/12 |

FOREIGN PATENT DOCUMENTS

WO     WO-2019193129 A1 * 10/2019   ............ H04W 48/16

* cited by examiner

*Primary Examiner* — Cheikh T Ndiaye
(74) *Attorney, Agent, or Firm* — Lee & Hayes, P.C.

(57) ABSTRACT

System and methods for selecting a session management function (SMF) for establishing a communications session for a user device based on the user device's protocol data network (PDN) type are described herein. An access management function (AMF) may query a network function (NF) repository function (NRF) for SMFs that serve an area associated with the user device. The AMF may select an SMF from those indicated by the NRF and determine whether the SMF can support the user device's PDN-Type and/or whether the SMF is included in a block list associated with that PDN-Type. If the SMF appears to support the user device's PDN-Type, the AMF attempts to establish a session for the user device. If that fails, the AMF adds the SMF to a block list for the user device's PDN-Type. Otherwise, the AMF provided session data to the user device's gNodeB for exchanging user data.

20 Claims, 10 Drawing Sheets

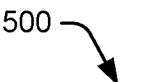

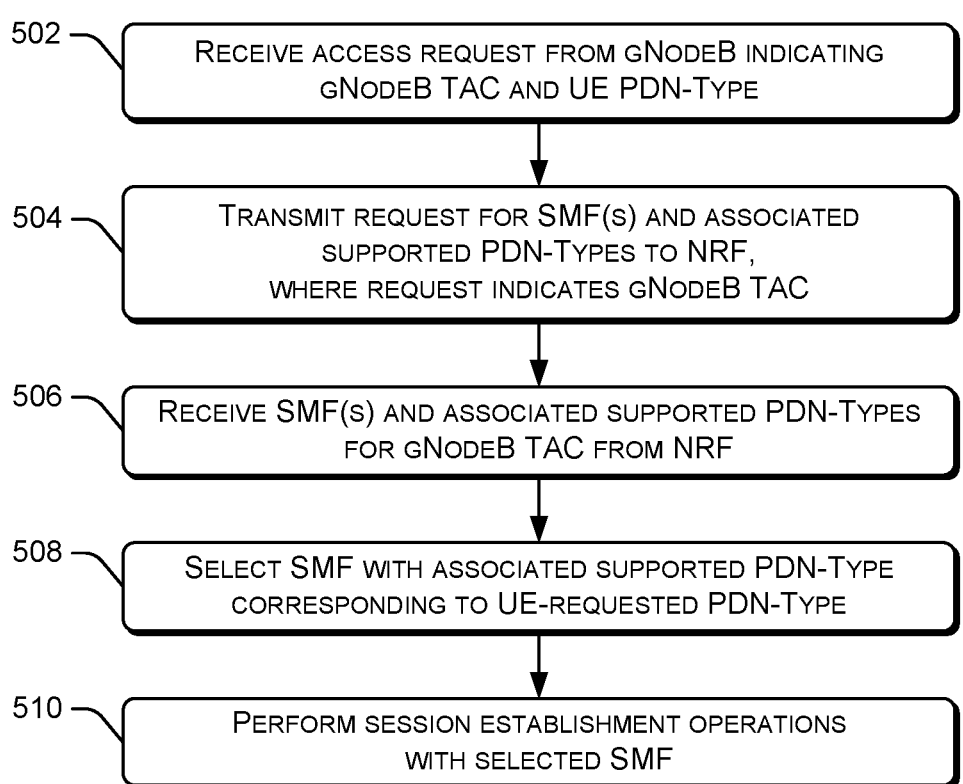

502 — RECEIVE ACCESS REQUEST FROM GNODEB INDICATING
GNODEB TAC AND UE PDN-TYPE

504 — TRANSMIT REQUEST FOR SMF(S) AND ASSOCIATED
SUPPORTED PDN-TYPES TO NRF,
WHERE REQUEST INDICATES GNODEB TAC

506 — RECEIVE SMF(S) AND ASSOCIATED SUPPORTED PDN-TYPES
FOR GNODEB TAC FROM NRF

508 — SELECT SMF WITH ASSOCIATED SUPPORTED PDN-TYPE
CORRESPONDING TO UE-REQUESTED PDN-TYPE

510 — PERFORM SESSION ESTABLISHMENT OPERATIONS
WITH SELECTED SMF

FIG. 5

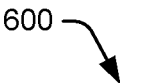
600
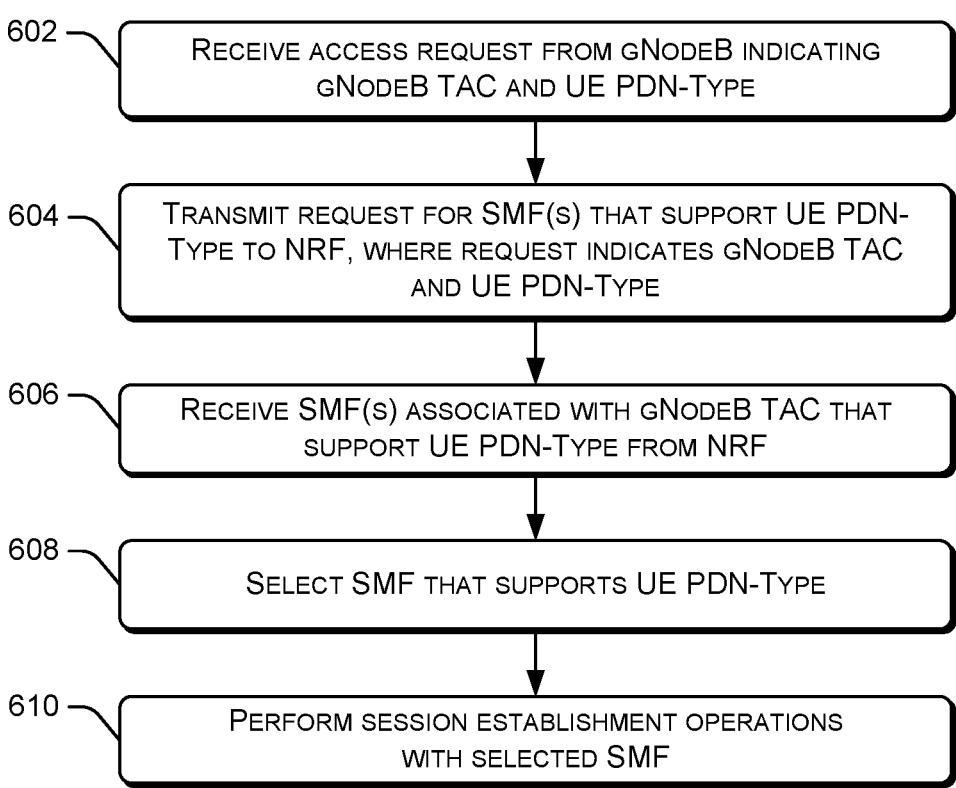
602 — RECEIVE ACCESS REQUEST FROM GNODEB INDICATING
GNODEB TAC AND UE PDN-TYPE
604 — TRANSMIT REQUEST FOR SMF(S) THAT SUPPORT UE PDN-
TYPE TO NRF, WHERE REQUEST INDICATES GNODEB TAC
AND UE PDN-TYPE
606 — RECEIVE SMF(S) ASSOCIATED WITH GNODEB TAC THAT
SUPPORT UE PDN-TYPE FROM NRF
608 — SELECT SMF THAT SUPPORTS UE PDN-TYPE
610 — PERFORM SESSION ESTABLISHMENT OPERATIONS
WITH SELECTED SMF
FIG. 6

SESSION MANAGEMENT FUNCTION SELECTION AND BLOCKING

BACKGROUND

The number of wireless communications devices (e.g., user devices such as mobile telephones, smartphones, tablets, laptops, etc.) and other types of computing devices connected to the Internet has rapidly grown since the Internet's inception. To accommodate this growth, the Internet Protocol (IP), one of the primary communications protocols used to facilitate electronic communications between devices, has been updated over time to provide for a larger number of device IP addresses. There are currently devices operating on the Internet capable of communicating using IP version 4 (IPv4), IP version 6 (IPv6), or both. The networks that provide services to such devices may also communicate using one or both of IPv4 and IPv6. However, because not all devices are capable of using both versions of IP, there may be attempts made to establish communications sessions between incompatible devices or using incompatible network devices and/or functions. Because there may be many different network devices and functions involved in establishing and facilitating communications between devices of varying capabilities, and because the capabilities and configurations of other devices and/or functions may not be known to a particular network device or function, it may be challenging to quickly and efficiently establish communications sessions for devices of varying capabilities and configurations in a wireless network.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 5 is a flow diagram of an illustrative process for performing session management function selection, in accordance with examples of the disclosure.

FIG. 6 is a flow diagram of another illustrative process for performing session management function selection, in accordance with examples of the disclosure.

DETAILED DESCRIPTION

Overview

Figure 1:
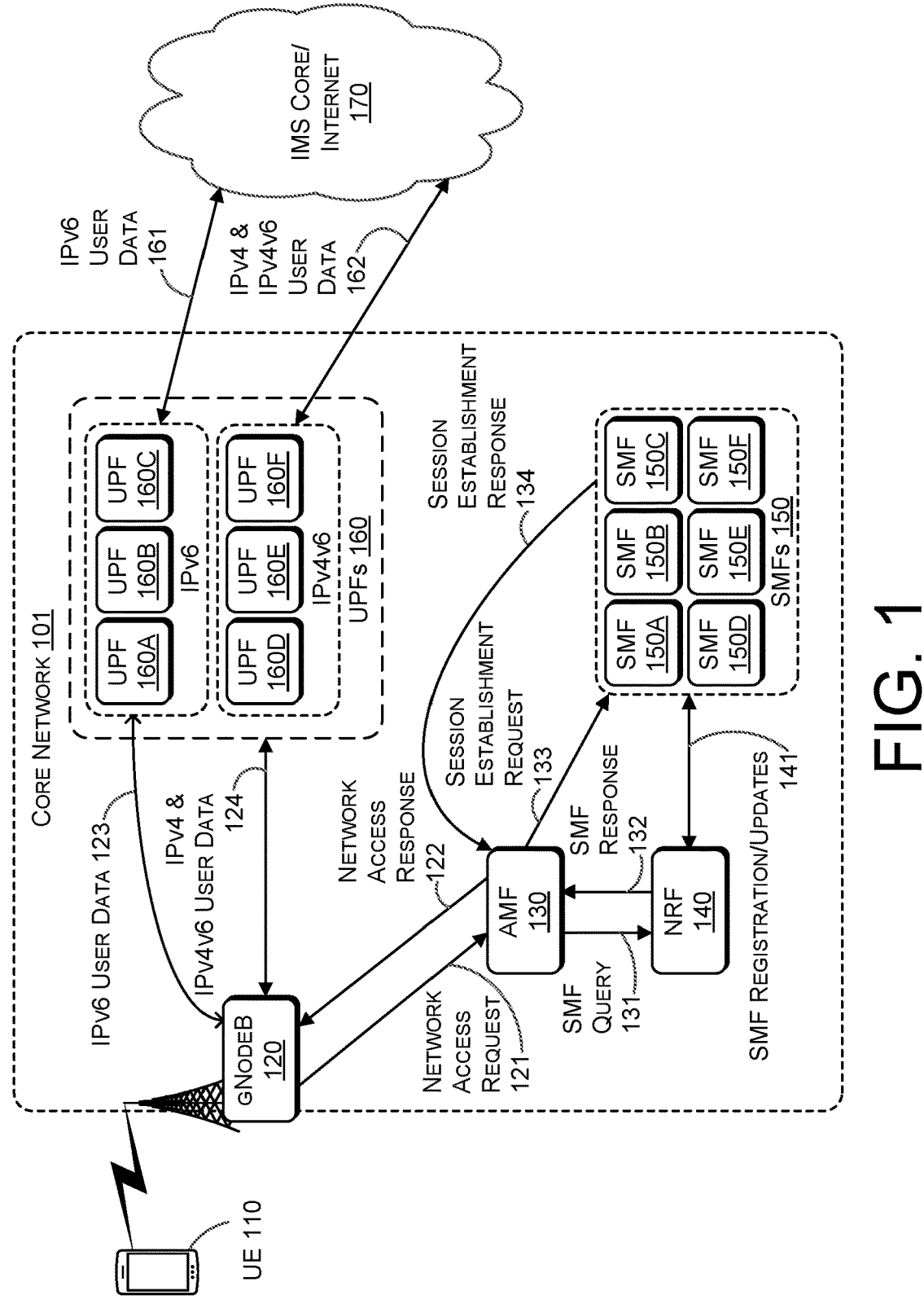
FIG. 1 is a schematic diagram of an illustrative wireless communications network environment in which systems and methods for session management function selection and blocking may be implemented, in accordance with examples of the disclosure.

This disclosure is directed in part to systems and techniques for performing session management function selection and blocking in wireless communications networks and other networks that perform wireless device registration and resource provisioning. Such networks include any networks that may facilitate wireless communications services for one or more wireless communications devices. Such networks include networks that support one or more 3GPP standards, including, but not limited to, Long Term Evolution (LTE) networks (e.g., 4G LTE networks) and New Radio (NR) networks (e.g., 5G NR networks). However, the disclosed systems and techniques may be applicable in any network or system in which a user device may request and receive access to communicate with one or more network and/or remote devices using any protocol.

In conventional systems, a wireless user device (e.g., mobile telephone, smartphone, user equipment (UE), etc.) may wirelessly communicate with a base station (e.g., gNodeB, eNodeB, NodeB, base transceiver station (BTS), etc.) to request wireless communications services, such as a packet data communication session between the user device and a data network (e.g., the Internet, an IP multimedia system or subsystem (IMS), etc.). Various operations may be performed by network components, devices, and/or functions to obtain or otherwise establish the requested services for the wireless user device. Such operations may include authenticating the wireless user device and/or a user of the device, authorizing the requested services for the device and/or user, registering the device at the various systems and functions needed to provide the requested services, etc.

For example, a UE may transmit a request for a packet data communications session (e.g., a request to establish a protocol data unit (PDU) session or a packet data network (PDN) connection) with a data network to a gNodeB. A communications session such as a PDU session or PDN connection, for example in a 5G network, may be an end-to-end communications session between a device (e.g., the UE) and a data network (e.g., the Internet, an IMS, etc.). Such connections or sessions may be referred to generally herein as "communications session" and may include, but are not limited to, any type of PDN connection, PDU session, and any other type of packet data communications connection or session. The gNodeB may relay or otherwise convey this communications session request to an access management function (AMF) in the core of the wireless network in which the gNodeB is configured. The AMF may interact with one or more other components to perform the operations needed to establish this communications session, such as authenticating the device and/or user, registering the UE with the network, etc. In a particular example, the AMF may interact with a session management function (SMF) to establish the communications session and/or obtain SMF-related information to be used for communications session establishment on behalf of the UE.

An SMF may perform various session establishment operations, such as determining and assigning particular functions and/or components to service the session, associating policies for the session, etc. In examples, an important function performed by an SMF may be providing the access information needed by the UE to communicate with a data network using the established session. The SMF provides this information to the AMF for relay to the gNodeB and ultimately to the UE requesting the PDU session. In 5G examples, the SMF data provided to the AMF and/or the gNodeB may include data indicating one or more user plane functions (UPFs) with which the UE, via the gNodeB, may communicate to exchange user data with one or more destination devices and/or networks.

A UPF may be configured to communicate with user devices, such as UEs, using one or more particular protocols. For example, a UPF may be configured to communicate with user devices using IPv4, IPv6, or both. In particular examples, a UPF may be configured to communicate with user devices using IPv6 (e.g., only) or using both IPv4 and IPv6 (referred to herein as "IPv4v6").

An SMF may be associated with one or more particular UPFs. For example, an SMF may be (e.g., statically) configured with information associated with one or more particular UPFs for which the SMF may facilitate communications session establishment (e.g., to establish sessions between user devices (via associated gNodeBs) and such UPFs). The UPFs associated with a particular SMF may (e.g., all) support IPv6 only or IPv4v6. Alternatively, the UPFs associated with a particular SMF may be a combination of UPFs, some of which support IPv6 only and others of which support IPv4v6. An SMF may be associated with a particular tracking area code (TAC) that may represent a particular area or section of a network (e.g., geographical area or network area) that may include one or more cells that are served by one or more associated gNodeBs that may provide communications services to the UEs and other devices in that area.

Components and functions within a network, such as AMFs and SMFs, may vary and may change often due to operational circumstances (e.g., maintenance, load, failures, etc.). Therefore, in various examples, a network may include a repository component or function that is configured to store and provide current addresses, identification information, and/or other connectivity information for the functions and/or components in the network. In response to receiving a request from a particular function in a network, a repository function may provide a current address (e.g., IP address) and/or other identifying information for another function to the requesting function. The requesting function may then use that address to communicate with the associated function to perform one or more operations. In 5G examples, such a repository function may be referred to as a network function (NF) repository function (NRF). These and other functions performing similar operations may be referred to generally herein as a "repository functions." In various embodiments, for example, for load-sharing and/or redundancy purposes, multiple NRFs may be configured in "pools" of NRFs that may be queried by various components and/or functions in (e.g., particular portions of) a core of a wireless network.

When an AMF receives a communications session establishment request from a gNodeB on behalf of a UE, the AMF may query an NRF for SMF data based on the request. For example, a UE may request a PDN connection from a gNodeB. The request from the UE may indicate the PDN-Type representing a particular protocol with which the UE may be configured to communicate (e.g., IPv4 or IPv6). The gNodeB may relay or otherwise provide the request to an AMF. This request and/or accompanying information transmitted by the gNodeB to the AMF may include the TAC associated with gNodeB.

In response to receiving an SMF query (or other request for SMF information) from an AMF, the NRF may determine one or more appropriate SMFs based on the request. For example, the NRF may determine one or more SMFs associated with the TAC indicated in the communications session establishment request. The NRF may then respond to the SMF query by transmitting identifying information (e.g., IP address, hostname, etc.) for those SMF(s) to the AMF. In examples, an NRF may determine a set of SMFs associated with the TAC indicated in the SMF query from the AMF and reply with identifying information for those SMFs. The AMF may then select (e.g., randomly) one of these SMFs to use for establishing a communications session for the UE.

In conventional systems, the AMF is not configured to provide the UE's PDN-Type to the NRF when requesting SMFs or SMF-related data. A conventional AMF may further have no means of determining the PDN-Type(s) for any particular SMF and a conventional NRF may not be configured to provide such information. Therefore, when there are SMFs of varying capabilities configured in a network for a particular TAC, there is a possibility that an SMF may be selected for use by an AMF that is not compatible with a UE. For example, an NRF may provide a set of SMFs to an AMF that include both IPv4v6-capable SMFs (e.g., SMFs that are associated with IPv4v6 UPFs) and (e.g., only) IPv6-capable SMFs (e.g., SMFs that are associated with IPv6 (e.g., only) UPFs). In such cases, if the UE is configured to communicate using IPv4 (e.g., only) and the AMF selects, from the set of SMFs, an IPv6-only SMF, the subsequent communications session establishment operations will fail because the IPv6 SMF is not configured to establish IPv4 communications sessions due to the lack of support for IPv4 at the corresponding IPv6 UPF. When this session establishment fails, the AMF must again attempt to establish a communications session, thereby wasting network and device resources by repeatedly requesting communications sessions each time an incompatible SMF/UPF is selected.

To address this issue of attempting to use incompatible SMFs and/or associated UPFs from those received from a repository function and to mitigate the inefficiency introduced into a network by repeatedly performing session establishment operations at various functions and/or components, the disclosed systems and methods allow for the use of the UE's PDN-Type in selection of an SMF and the blocking of the selection of incompatible SMFs by an AMF.

In various examples, an SMF may be configured to provide to an NRF its supported PDN-Type(s) (e.g., at registration). The NRF may then provide these supported PDN-Types with the SMF data in response to an SMF query from an AMF. The AMF may then determine an SMF based on the UE PDN-Type provided by the gNodeB. For example, the AMF may eliminate from a set of SMFs provided by an NRF those SMFs that do not support the UE PDN-Type provided by the gNodeB and may then select an SMF from the remaining SMFs that do support that UE PDN-Type. The AMF may then attempt to establish a communications session for the UE using the selected SMF.

In another example, where an SMF is configured to provide to an NRF its supported PDN-Type(s), the AMF may provide a UE's PDN-Type as indicated by a gNodeB, along with the gNodeB's TAC, to the NRF with the SMF query. The NRF may determine those SMFs associated with the indicated TAC and then eliminate from that set of SMFs those SMFs that do not support the UE PDN-Type provided by the AMF. The NRF may then determine a set of SMFs from the remaining SMFs associated with the TAC that do support that UE PDN-Type and provide that set of SMFs to the AMF. The AMF may then select an SMF from this set and attempt to establish a communications session for the UE using the selected SMF.

In another example, an AMF may generate and/or use one or more "block lists" and/or "permit lists" of SMFs based on detecting unsuccessful and/or successful communication session establishment operations. These lists may include one or more entries that indicate identifying information for particular SMFs and the associated PDN-Types that the SMFs support and/or do not support. An AMF may use such lists to select the SMF to use for establishing a communications session from a set of SMFs provided by an NRF based on a UE PDN-Type provided by the gNodeB. For example, the AMF may determine a UE PDN-Type of IPv4 and a TAC from a communications session request received from a gNodeB on behalf of a UE. The AMF may then request and receive a set of SMFs from an NRF for the TAC. The AMF may select an SMF from this set and compare it to a list configured on the AMF that indicates SMF capabilities (or lack thereof) to determine whether to use this SMF for establishing a communications session or to select an alternative SMF.

For example, the AMF may be configured to maintain a block list of SMFs that are incompatible with IPv4 (e.g., that are not configured for communicating using IPv4 and/or are associated with UPFs that are not configured for communicating using IPv4). The AMF may receive a communications session establishment request from a gNodeB for a UE that is configured to use IPv4. The AMF may then request and receive, from an NRF, a set of SMFs. The AMF may select an AMF from this set and determine whether the selected SMF is represented in the block list. If so, the AMF may select another SMF from the remaining set and compare it to the block list, and so forth, until the AMF determines an SMF from the set that is not included in the block list. Alternatively or additionally, the AMF may initially remove any of the SMFs in the received set of SMFs that are included in the block list of SMFs that are incompatible with IPv4 to determine a subset of IPv4-compatible SMFs. The AMF may then select an SMF (e.g., randomly) from the subset of IPv4-compatible SMFs to use for setting up the IPv4 communications session for the UE. In examples, if the block list is unpopulated, the AMF may select an SMF from the set of SMFs provided by an NRF.

In another example, the AMF may be configured to maintain a permit list of SMFs that are compatible with IPv4 (e.g., that are configured for communicating using IPv4 and/or are associated with UPFs that are configured for communicating using IPv4). The AMF may receive a communications session establishment request from a gNodeB for a UE that is configured to use IPv4. The AMF may then request and receive, from an NRF, a set of SMFs. The AMF may select an AMF from this set and determine whether the selected SMF is represented in the permit list. If not, the AMF may select another SMF from the remaining set and compare it to the permit list, and so forth, until the AMF determines an SMF from the set that is included in the permit list. Alternatively or additionally, the AMF may remove any of the SMFs in the received set of SMFs that are not included in the permit list of SMFs that are compatible with IPv4 to determine a subset of IPv4-compatible SMFs. The AMF may then select an SMF (e.g., randomly) from the subset of IPv4-compatible SMFs to use for setting up the IPv4 communications session for the UE. In examples, if the permit list is unpopulated, the AMF may select an SMF from the set of SMFs provided by an NRF.

To populate a block list and/or a permit list, the AMF may track the success and/or failure of session establishment operations. For example, when an AMF selects an incompatible SMF and requests a session established for a UE using a PDN-Type that the selected SMF does not support, the SMF may respond with a session establishment failure or connection rejection message. This message may indicate that the SMF does not support the requested PDN-Type. Based on this message, the AMF may add that SMF and an associated indication of the incompatible PDN-Type to its block list.

Alternatively or additionally, when an AMF selects a compatible SMF and requests a session established for a UE using a PDN-Type that the selected SMF supports, the SMF may respond with a session establishment message or a connection success message. This message may indicate that the SMF does support the requested PDN-Type, for example, by indicating that a session has been or is in the process of being established. Based on this message, the AMF may add that SMF and an associated indication of the compatible PDN-Type to its permit list.

In examples, an AMF may maintain only a block list, only a permit list, both a block list and a permit list, or a single list that includes both block and permit information. Such lists may take the form of any type of data structure.

By facilitating the use of PDN-Types, block lists, and permit lists at an AMF to select an SMF for a UE and associated communications session establishment operations, the systems and methods described herein provide more efficient communications session establishment operations and reduced resource utilization. By minimizing the likelihood of repeatedly attempting to establish a communications session for a UE based on performing establishment operations involving SMFs and/or UPFs incompatible with the UE, the systems and methods described herein can improve the performance and increase the efficiency of both network and user resources. For example, the methods and systems described herein may be more efficient and/or more robust than conventional techniques, as they may increase the speed of the communication session establishment process and reduce the wasting of resources on repeated attempts to establish communications sessions after failed attempts using incompatible SMFs and/or UPFs. That is, the methods and systems described herein provide a technological improvement over existing SMF selection and communications session establishment systems and processes by facilitating improved SMF determination accuracy and increasing network efficiency by reducing the traffic associated with failed attempts to communicate using incompatible SMFs and/or UPFs. In addition to improving the efficiency of network and device resource utilization, the systems and methods described herein can provide more robust systems by, for example, making more efficient use of network devices by reducing unnecessary and/or unproductive device and network signaling and processing associated with attempting to communicate with incompatible SMFs and/or UPFs, thereby freeing network and device resources for more productive operations.

Illustrative environments, signal flows, and techniques for implementing systems and methods for repository function address blocking are described below. However, the described systems and techniques may be implemented in other environments.

Illustrative System Architecture

FIG. 1 is a schematic diagram of an illustrative wireless network environment 100 in which the disclosed systems and techniques may be implemented. The environment 100 may include a UE 110 that may wirelessly communicate with a gNodeB 120. While referred to as a "gNodeB" for explanatory purposes herein, the gNodeB 120 may be any type of base station, including, but not limited to, any type of BTS, NodeB, eNodeB, gNodeB, etc. The gNodeB 120 may communicate with other components and functions in a core network 101. The core network 101 may be any one or more networks that facilitate communications between particular devices, components, and/or functions of various types in the core of a wireless communications network that may facilitate communication between computing devices and/or mobile devices (e.g., UEs). Various connections between components and functions in the core network 101 may be wired, wireless, or a combination thereof. The components and functions described herein may be implemented as physical devices, as software components and/or functions executing on one or more computing devices, and as any combination thereof. In various embodiments, the core network 101 may facilitate the establishment of communications sessions for one or more wireless devices, such as UE 110. In examples, the core network 101 may facilitate authorized packet-based communications between such wireless devices and other wireless devices, devices on the Internet, one or more IMSs, and/or one or more other data networks (DNS).

In FIG. 1, connections between components may be logical connections that may be facilitated by one or more wired and/or wireless connections and may include traversal of one or more devices, components, and/or functions that may or may not be shown in FIG. 1.

In environment 100, the UE 110 may communicate with the gNodeB 120 to request the establishment of a communications session (e.g., to communicate with one or more systems at the Internet 190, such as a PDN connection or a PDU session). The gNodeB 120 may relay the request or otherwise transmit a network access request 121 for the establishment of the communications session to an AMF 130. The network access request 121 may include an indication of the gNodeB 120's TAC. In examples, the network access request 121 may also, or instead, include an indication of the UE 110's PDN-Type, which may have been provided by the UE 110 in the request to establish the communications session.

In various examples, the AMF 130 may interact with an NRF and/or other components of the core network 101 to determine the resources required to establish communications sessions for UEs. Such interactions may include authenticating and authorizing a user and/or user device (e.g., UE), creating contexts for such sessions, determining and applying session policies, establishing user plane resources, etc. In examples, the AMF 130, may query an NRF 140 with an SMF query 131 that may indicate the TAC associated with the gNodeB 120. In examples, the SMF query 131 may also, or instead, include an indication of the UE 110's PDN-Type as provided by the gNodeB 120 (e.g., in the network access request 121).

The NRF 140 may respond to the SMF query 131 by transmitting an SMF response 132 to the AMF 130. The SMF response 132 may include one data indicating one or more SMFs that may be associated with the TAC associated with the gNodeB 120 and indicated in the SMF query 131. In some examples, and as described in more detail herein, the SMF response 132 may include one or more supported PDN-Types for each SMF indicated in the SMF response 132. Alternatively or additionally, the SMF response 132 may include (e.g., only) one or more SMFs that support a PDN-Type that may have been indicated in the SMF query 131 representing the UE 110's PDN-Type (with or without an indication of the supported PDN-Type). In other examples, the SMF response 132 may include one or more SMFs associated with the TAC associated with the gNodeB 120, but without indications of supported PDN-Types for such SMFs.

The NRF 140 may acquire SMF data via SMF registration and updates 141. For example, the SMFs 150 (representing at least SMFs 150A-150F) may register with the NRF 140 and provide their associated TACs. In examples, the SMFs 150, when registering with the NRF 140, may also, or instead, indicate to the NRF 140 the PDN-Types that each of the SMFs 150 supports.

The SMFs 150 may individually be associated with one or more of the UPFs 160. For example, the SMF 150A may be associated with the UPF 160A, the SMF 150B may be associated with the UPF 160B, the SMF 150C may be associated with the UPF 160C, and so forth. Individual UPFs of the UPFs 160 may support various PDN-Types, and therefore the corresponding SMFs of the SMFs 150 may support, or be considered to support, the same PDN-Types. For example, each of the UPFs 160A-160C may support only the PDN-Type IPv6, and therefore the respective corresponding SMFs 150A-150C may support only the PDN-Type IPv6. Similarly, each of the UPFs 160D-160F may support the PDN-Type IPv4v6, and therefore the respective corresponding SMFs 150D-150F may support the PDN-Type IPv4v6, and so forth.

In examples, the AMF 130 may select an SMF from among the one or more SMFs (e.g., one or more of the SMFs 150) indicated in the SMF response 132. The AMF 130 may then attempt to establish a communications session for the UE by transmitting a session establishment request 133 to the selected SMF. In response to the session establishment request 133, the selected SMF may transmit a session establishment response 134 reporting the success, failure, or other status of the session establishment. In examples, the session establishment request 133 may include the PDN-Type associated with the UE 110, the TAC associated with the gNodeB 120, and/or any other data that may facilitate establishing a communications session. The session establishment response 134 may include an indication that a session has been successfully established for the UE 110 and may indicate one or more UPFs for the UE 110's use. Alternatively, the session establishment response 134 may include an indication that the SMF failed to establish the session and one or more error codes and/or indications of failure types. For example, a session establishment response 134 may indicate that the selected SMF is not configured to establish communications sessions for the PDN-Type indicated in the session establishment request 133.

The AMF 130 may transmit a network access response 122 to the gNodeB 120, for example, after setting up a communications session for the UE 110. The network access response 122 may include data that the gNodeB may provide to the UE 110 for communicating with other systems and/or networks, such as one or more UPFs. The UE 110 may then communicate, via the gNodeB 120 with one or more UPFs to exchange user data. For example, the UE 110 may communicate with one or more of UPFs 160A-160C to exchange IPv6 user data 123. In another example, the UE 110 may communicate with one or more of UPFs 160D-160F to exchange IPv4 and/or IPv4v6 user data 124.

The corresponding UPF(s) may facilitate the exchange of user data with the Internet and/or other devices or networks. For example, one or more of UPFs 160A-160C may exchange IPv6 user data 161 associated with UE 110 with IMS core and/or Internet 170 (e.g., relaying or otherwise based on IPv6 user data 123). In another example, one or more of UPFs 160D-160F may exchange IPv4 and/or IPv4v6 user data 162 associated with UE 110 with IMS core and/or Internet 170 (e.g., relaying or otherwise based on IPv4 and/or IPv4v6 user data 124).

As described in more detail herein, the AMF 130 may use PDN-Types to select an SMF. In various examples, the SMFs 150 may include one or more supported PDN-Types when registering with the NRF. For example, SMFs 150A-150C may indicate that each such SMF supports IPv6 (e.g., only), and the NRF 140 may store data representing the PDN-Type and associating the PDN-Type with these SMFs. Similarly, SMFs 150D-150F may indicate that each such SMFs support IPv4v6 and the NRF 140 may store data representing that PDN-Type and associating the PDN-Type with these SMFs.

In such examples, the AMF 130 may include an indication of the UE 110's PDN-Type (along with an indication of the gNodeB 120's TAC) in the SMF query 131. The NRF 140 may determine the contents of the SMF response 132 based on this PDN-Type by selecting and including in the SMF response 132 SMFs associated with the gNodeB 120's TAC that support the PDN-Type indicated in the SMF query 131. The AMF 130 may select any of the SMFs indicated in the SMF response 132 for use in establishing the communications session for the UE 110.

In other such examples, the NRF 140 may include an indication of the supported PDN-Type for each SMF indicated in the SMF response 132. The AMF 130 may then determine a subset of these SMFs based on the PDN-Type associated with the UE 110 and select any of the SMFs in this subset for use in establishing the communications session for the UE 110.

The AMF 130 may also, or instead, use one or more lists of SMFs for selecting an SMF to use for establishing a communications session for the UE 110. For example, the AMF 130 may select an SMF from the set of SMFs indicated in the SMF response 132 and compare it to a permit list and/or a block list of SMFs. If the selected SMF is in a permit list associated with a same PDN-Type as that associated with the UE 110, the AMF 130 may use that SMF in establishing the communications session for the UE 110. If the selected SMF is not in a permit list associated with UE 110's PDN-Type, the AMF 130 may eliminate that SMF from consideration and may select another SMF from the remaining SMFs in the set of SMFs provided in the SMF response 132. Similarly, if the selected SMF is in a block list associated with a same PDN-Type as that associated with the UE 110, the AMF 130 may eliminate that SMF from consideration and select another SMF from the remaining SMFs in the set of SMFs provided in the SMF response 132. If the selected SMF is not in a block list associated with UE 110's PDN-Type, the AMF 130 may use that SMF in establishing the communications session for the UE 110.

Illustrative Functions and Communications

Figure 2:
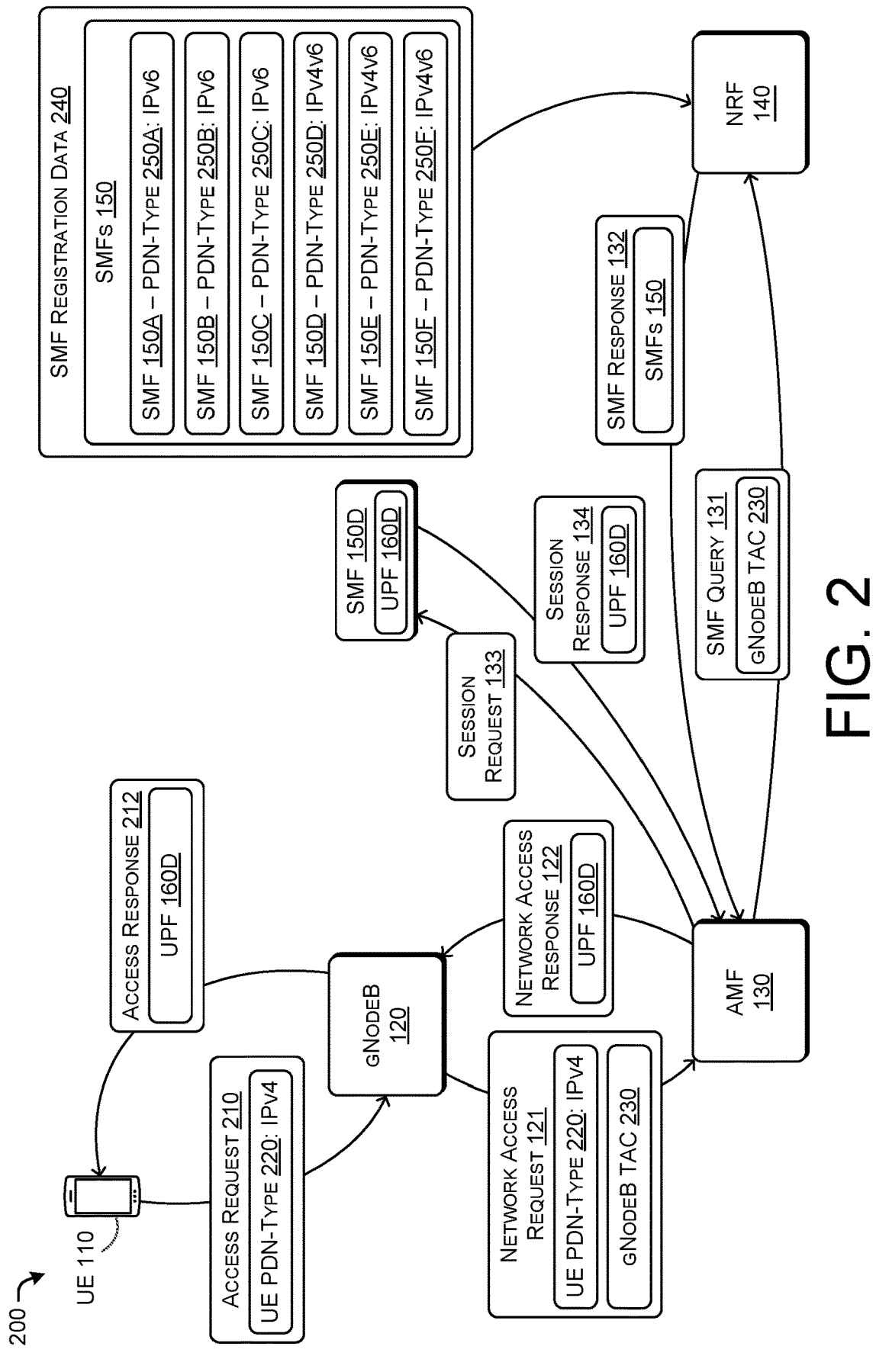
FIG. 2 is a schematic diagram of illustrative functions and communications that may be implemented in a wireless communications network in which systems and methods for session management function selection and blocking may be implemented, in accordance with examples of the disclosure.
Figure 3:
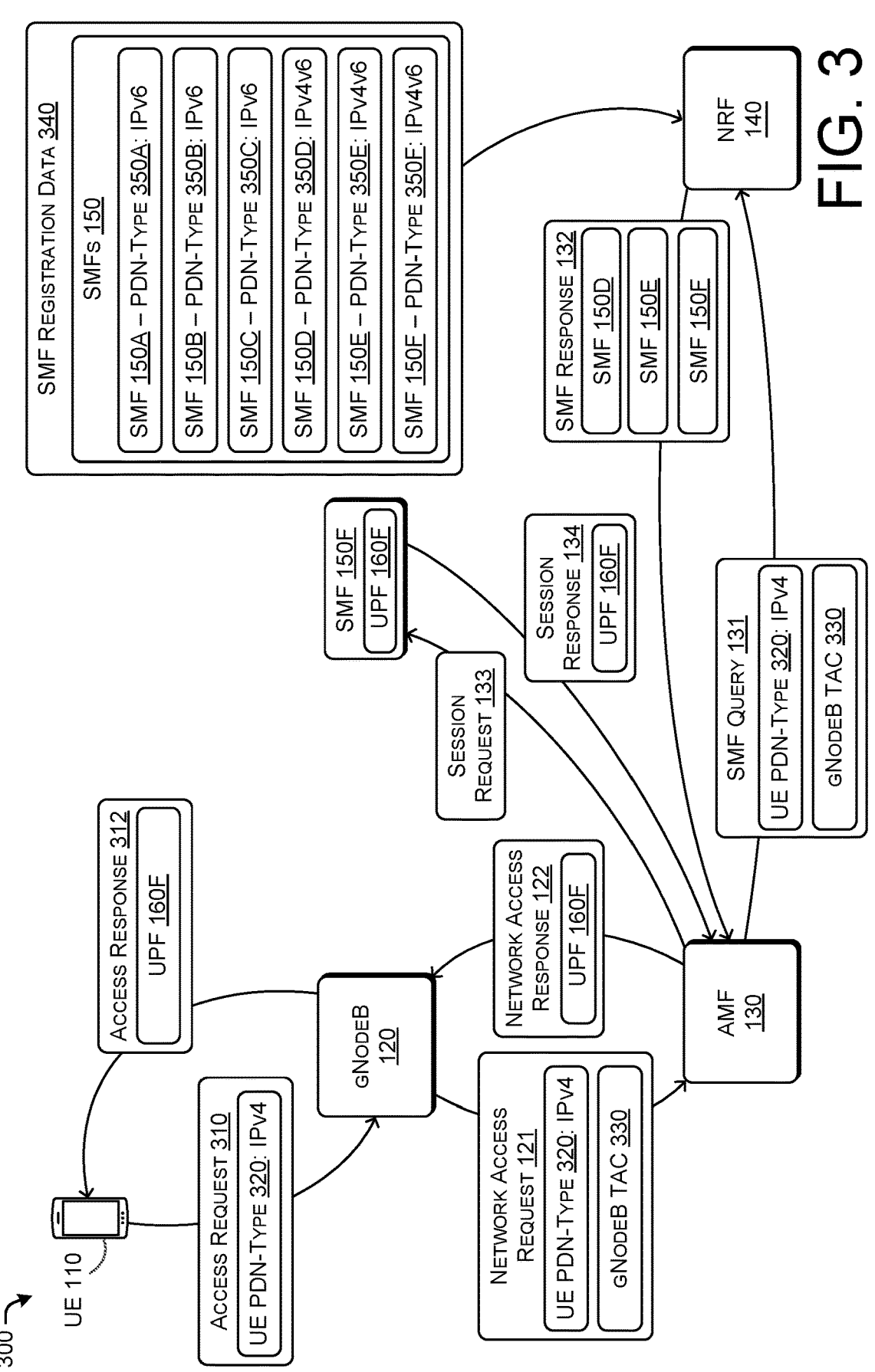
FIG. 3 is a schematic diagram of illustrative functions and communications that may be implemented in a wireless communications network in which systems and methods for session management function selection and blocking may be implemented, in accordance with examples of the disclosure.

FIGS. 2-4 illustrate schematic diagrams of exemplary functions and communications of various messages that may be exchanged in one or more of the disclosed systems and techniques for performing session management function selection and blocking as described herein. Reference may be made in this description of the exemplary functions and communications to devices, messages, functions, components, and/or operations illustrated in FIG. 1 and described in regard to that figure. However, the functions and communications illustrated in FIGS. 2-4 and described herein may be implemented in any suitable system and/or with any one or more suitable devices and/or entities. Moreover, any of the functions and communications described in regard to FIGS. 2-4 may be used separately and/or in conjunction with other functions and communications and/or implemented using devices, systems, and or operations. All such embodiments are contemplated as within the scope of the instant disclosure.

FIG. 2 illustrates schematic diagram 200 that may represent a subset of the functions and components represented in environment 100 of FIG. 1. In this example, the NRF may be configured to provide PDN-Type support data for SMFs in response to an SMF query. The AMF may then use this data to select an appropriate SMF to use for establishing a communications session for a UE configured to use a particular PDN-Type.

The UE 110 may transmit an access request 210 to the gNodeB 120 requesting the establishment of a communications session. The access request 210 may include an indication of the UE PDN-Type 220. In this example, the UE PDN-Type 220 may be IPv4.

The gNodeB 120, in response to the access request 210, may transmit a network access request 121 to the AMF 130 requesting the establishment of a communications session for the UE 110. The network access request 121 may indicate the UE PDN-Type 220 (e.g., IPv4) and a gNodeB TAC 230.

In response to the network access request 121, the AMF 130 may transmit an SMF query 131 to the NRF 140 requesting SMF data for one or more SMFs that service the area associated with the gNodeB TAC 230. The SMF query 131 may include the gNodeB TAC 230. The SMF query 131 may further request supported PDN-Types for the SMFs associated with the gNodeB TAC 230. Alternatively, the NRF 140 may be configured to provide supported PDN-Types for the SMFs in response to SMF queries.

The NRF 140 may respond with an SMF response 132 that may indicate the SMFs 150 and their associated supported PDN-Type. For example, the SMFs 150 may have registered with the NRF 140 and provided SMF registration data 240 that may include data representing the TACs serviced by respective SMFs and supported PDN-Types. For instance, as shown here, SMF 150A may be associated with a PDN-Type 250A (e.g., IPv6), SMF 150B may be associated with a PDN-Type 250B (e.g., IPv6), SMF 150C may be associated with a PDN-Type 250C (e.g., IPv6), SMF 150D may be associated with a PDN-Type 250D (e.g., IPv4v6), SMF 150E may be associated with a PDN-Type 250E (e.g., IPv4v6), and SMF 150F may be associated with a PDN-Type 250F (e.g., IPv4v6). This data may be provided by the NRF 140 to the AMF 130 (represented as SMFs 150) in the SMF response 132.

The AMF 130 may then select an SMF from the SMFs 150 that supports the UE PDN-Type 220 (e.g., IPv4). In examples, the AMF 130 may eliminate from consideration those SMFs in the SMF 150 that do not support the PDN-Type 220 (e.g., SMF 150A, SMF 150B, and SMF 150C) and then select (e.g., randomly) an SMF from the remaining SMFs 150 (e.g., from SMF 150D, SMF 150E, and SMF 150F).

In this example, the AMF 130 may select SMF 150D. The AMF 130 may then transmit a session request 133 to the SMF 150D which may, in response, perform operations to establish a communications session for the UE 110 using the UE PDN-Type 220. Because the AMF 130 was informed of the supported PDN-Type for the SMF 150D by the NRF 140, there may be much less likelihood of establishment failure, especially due to lack of support by the SMF 150D of the UE PDN-Type 220.

Based on successful establishment of the communications session for the UE 110 supporting the UE PDN-Type 220, the SMF 150D may transmit the session response 134 to the AMF 130. The session response 134 may include one or more indications of UPFs associated with the SMF 150D for use by the UE 110 and/or the gNodeB 120 for user data. In this example, the SMF 150D may be associated with the UPF 160D, and therefore the session response 134 may include an indication of the UPF 160D. In examples, the session response 134 may also, or instead, include any one or more other UPFs and/or any other data that may be used by a gNodeB and/or a UE to communicate using the established communications session. Alternatively, if the SMF 150D was unable to establish the communications session, the session response 134 may include an error code, failure message, and/or any other data that may indicate to the AMF 130 that the session was not established.

Based on the session response 134, the AMF 130 may transmit the network access response 122 to the gNodeB 120. The network access response 122 may include an indication of the UPF 160D. The gNodeB 120 may then transmit an access response 212 to the UE 110. The access response 212 may include an indication of the UPF 160D that the UE 110 may use to establish user data communications with the UPF 160D and exchange user data with one or more devices or networks via the UPF 160D. Alternatively or additionally, the gNodeB 120 may interact with the UPF 160D and exchange user data originating at and/or destined for the UE 110 with the UPF 160D.

FIG. 3 illustrates schematic diagram 300 that may represent a subset of the functions and components represented in environment 100 of FIG. 1. In this example, the NRF may be configured to receive a PDN-Type in an SMF query and provide SMFs that support the indicated PDN-Type in response to the SMF query. The AMF may then select an SMF from these SMFs to use for establishing a communications session for a UE configured to use the PDN-Type.

The UE 110 may transmit an access request 310 to the gNodeB 120 requesting the establishment of a communications session. The access request 310 may include an indication of the UE PDN-Type 320. In this example, the UE PDN-Type 320 may be IPv4.

The gNodeB 120, in response to the access request 310, may transmit a network access request 121 to the AMF 130 requesting the establishment of a communications session for the UE 110. The network access request 121 may indicate the UE PDN-Type 320 (e.g., IPv4) and a gNodeB TAC 330.

In response to the network access request 121, the AMF 130 may transmit an SMF query 131 to the NRF 140 requesting SMF data for one or more SMFs that service the area associated with the gNodeB TAC 330. The SMF query

131 may include the gNodeB TAC 330. The SMF query 131 may further indicate the UE PDN-Type 320.

The NRF 140 may respond with an SMF response 132 that may indicate the SMFs 150 that support a PDN-Type corresponding to the UE PDN-Type 320. For example, the SMFs 150 may have registered with the NRF 140 and provided SMF registration data 340 that may include the TACs serviced by respective SMFs and supported PDN-Types. For instance, as shown here, SMF 150A may be associated with a PDN-Type 350A (e.g., IPv6), SMF 150B may be associated with a PDN-Type 350B (e.g., IPv6), SMF 150C may be associated with a PDN-Type 350C (e.g., IPv6), SMF 150D may be associated with a PDN-Type 350D (e.g., IPv4v6), SMF 150E may be associated with a PDN-Type 350E (e.g., IPv4v6), and SMF 150F may be associated with a PDN-Type 350F (e.g., IPv4v6). The NRF 140 may use this data to determine that SMF 150D, SMF 150E, and SMF 150F support a PDN-Type corresponding to the UE PDN-Type 320 (e.g., IPv4). The NRF 140 may therefore include an indication of each of SMF 150D, SMF 150E, and SMF 150F in the SMF response 132. The SMF response 132 may also include an indication of the PDN-Type corresponding to the UE PDN-Type 320.

The AMF 130 may then select an SMF from among SMF 150D, SMF 150E, and SMF 150F indicated in the SMF response 132. In examples, the AMF 130 may randomly select an SMF from among these SMFs.

In this example, the AMF 130 may select SMF 150F. The AMF 130 may then transmit a session request 133 to the SMF 150F which may, in response, perform operations to establish a communications session for the UE 110 using the UE PDN-Type 320. Because the AMF 130 requested SMFs that support the UE PDN-Type 320 and SMF 150F was among those provided by the NRF 140 in response, there may be much less likelihood of establishment failure, especially due to lack of support by the SMF 150F of the UE PDN-Type 320.

Based on successful establishment of the communications session for the UE 110 supporting the UE PDN-Type 320, the SMF 150F may transmit the session response 134 to the AMF 130. The session response 134 may include one or more indications of UPFs associated with the SMF 150F for use by the UE 110 and/or gNodeB 120 for user data. In this example, the SMF 150F may be associated with the UPF 160F, and therefore the session response 134 may include an indication of the UPF 160F. In examples, the session response 134 may also, or instead, include any one or more other UPFs and/or any other data that may be used by a gNodeB and/or a UE to communicate using the established communications session. Alternatively, if the SMF 150F was unable to establish the communications session, the session response 134 may include an error code, failure message, and/or any other data that may indicate to the AMF 130 that the session was not established.

Based on the session response 134, the AMF 130 may transmit the network access response 122 to the gNodeB 120. The network access response 122 may include an indication of the UPF 160F. The gNodeB 120 may then transmit an access response 312 to the UE 110. The access response 312 may include an indication of the UPF 160F that the UE 110 may use to establish user data communications with the UPF 160F and exchange user data with one or more devices or networks via the UPF 160F. Alternatively or additionally, the gNodeB 120 may interact with the UPF 160F and exchange user data originating at and/or destined for the UE 110 with the UPF 160F.

Figure 4A:
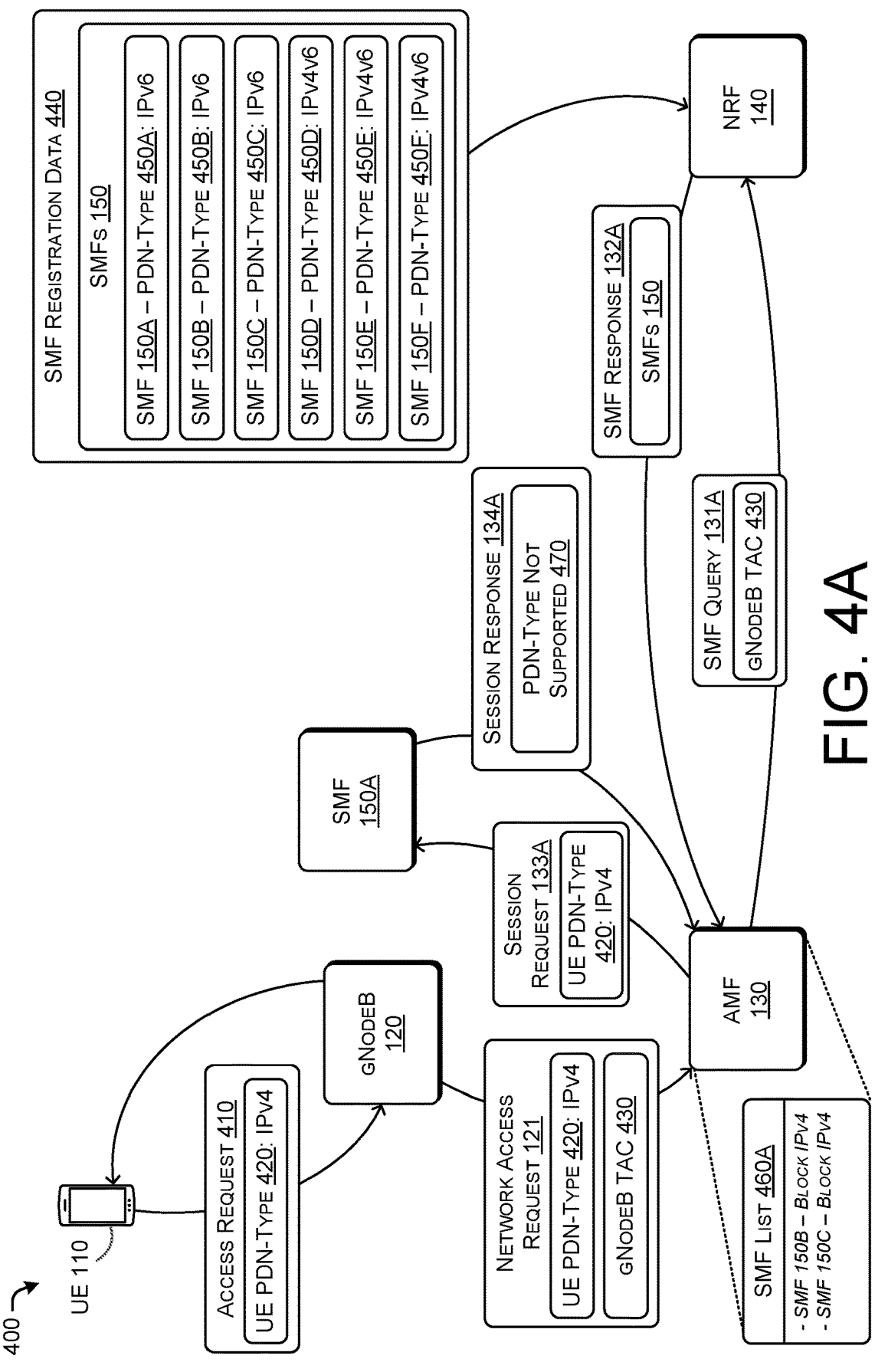
FIGS. 4A and 4B are schematic diagrams of illustrative functions and communications that may be implemented in a wireless communications network in which systems and methods for session management function selection and blocking may be implemented, in accordance with examples of the disclosure.
Figure 4B:
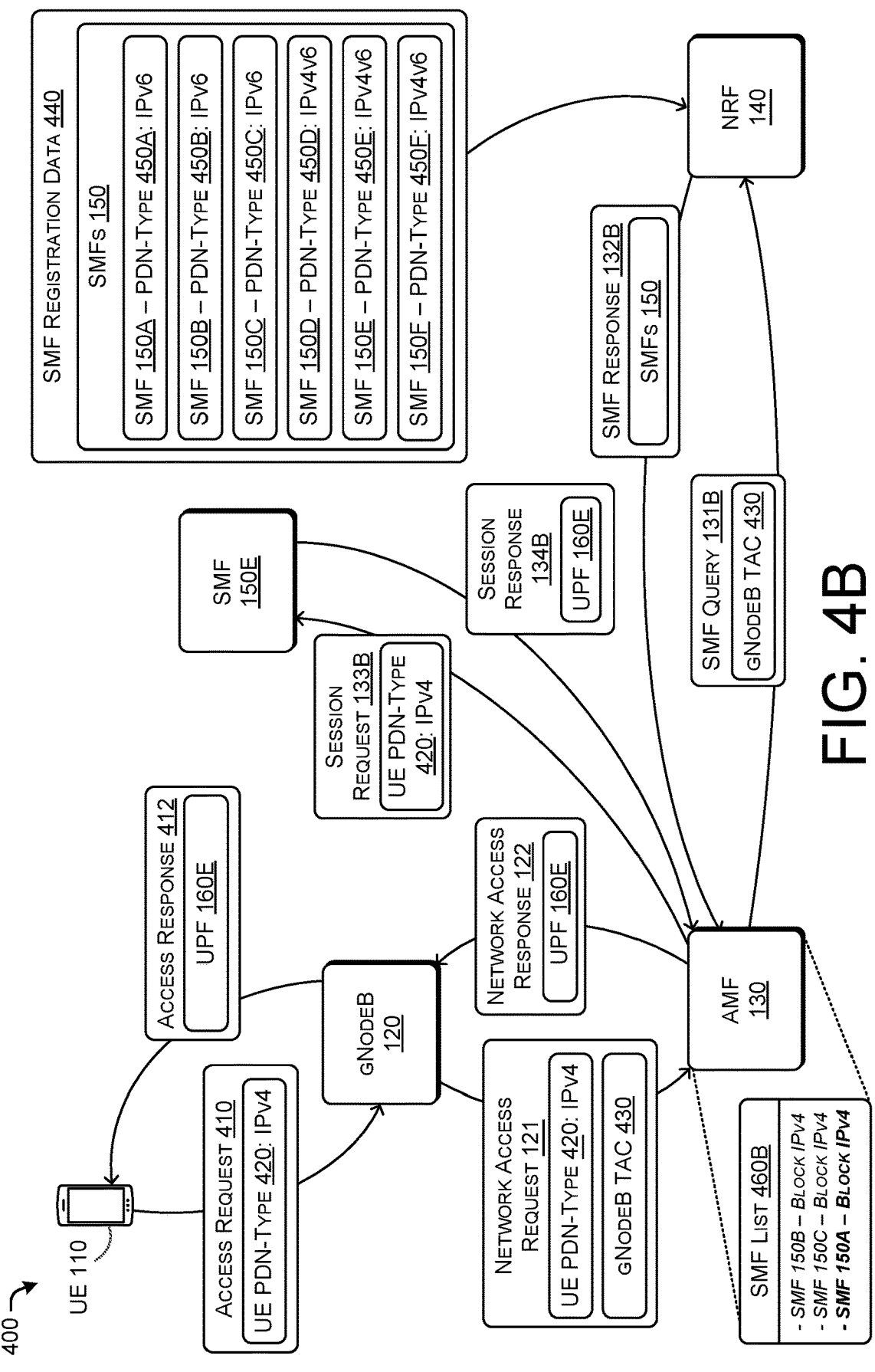

FIGS. 4A and 4B illustrate schematic diagram 400 that may represent a subset of the functions and components represented in environment 100 of FIG. 1. In this example, an AMF may be configured to generate and maintain one or more lists of SMFs based on the PDN-Types that such SMFs may or may not support. The AMF may use such one or more lists when selecting an SMF from among the SMFs provided by an NRF to use for establishing a communications session for a UE configured to use a particular PDN-Type.

The UE 110 may transmit an access request 410 to the gNodeB 120 requesting the establishment of a communications session. The access request 410 may include an indication of the UE PDN-Type 420. In this example, the UE PDN-Type 420 may be IPv4.

The gNodeB 120, in response to the access request 410, may transmit a network access request 121 to the AMF 130 requesting the establishment of a communications session for the UE 110. The network access request 121 may indicate the UE PDN-Type 420 (e.g., IPv4) and a gNodeB TAC 430.

In response to the network access request 121, the AMF 130 may transmit an SMF query 131A to the NRF 140 requesting SMF data for one or more SMFs that service the area associated with the gNodeB TAC 430. The SMF query 131A may include the gNodeB TAC 430. The SMF query 131A may not indicate the UE PDN-Type 420.

The NRF 140 may respond with an SMF response 132A that may indicate the SMFs 150 that provide service to the area associated with the gNodeB TAC 430. This may include SMFs supporting and/or incompatible with a variety of PDN-Types. For example, the SMFs 150 may have registered with the NRF 140 and provided SMF registration data 440. In this example, the SMF registration data 440 may include the TACs serviced by respective SMFs but not include PDN type data. For instance, as shown here, SMF 150A may be associated with a PDN-Type 450A (e.g., IPv6), SMF 150B may be associated with a PDN-Type 450B (e.g., IPv6), SMF 150C may be associated with a PDN-Type 450C (e.g., IPv6), SMF 150D may be associated with a PDN-Type 450D (e.g., IPv4v6), SMF 150E may be associated with a PDN-Type 450E (e.g., IPv4v6), and SMF 150F may be associated with a PDN-Type 450F (e.g., IPv4v6). However, the PDN-Types 450A, 450B, 450C, 450D, 450E, and 450F may not be provided to and/or stored by the NRF 140. The NRF 140 may use this data to determine that SMF 150A, SMF 150B, SMF 150C, 150D, SMF 150E, and SMF 150F service the area associated with the gNodeB TAC 430. The NRF 140 may therefore include an indication of each of these SMFs 150 in the SMF response 132A.

The AMF 130 may then select an SMF from among SMFs 150 indicated in the SMF response 132A. In examples, the AMF 130 may randomly select an SMF from among these SMFs. The AMF 130 may compare the selected SMF to those SMFs listed in an SMF list 460A. The SMF list 460A may include data representing SMFs that do not support a particular PDN-Type. For example, the SMF list 460A may list SMFs that do not support IPv4, as shown in this example (e.g., SMF 150B and SMF 150C). The AMF 130 may maintain the block list based on the results of session establishment operations as described herein. Alternatively or additionally, the AMF 130 may generate and/or maintain a permit list that includes data representing SMFs that support a particular PDN-Type. For example, a permit list configured at the AMF 130 may list SMFs that do support IPv4, such as SMF 150D, SMF 150E, and/or SMF 150F. Alternatively or additionally, the AMF 130 may generate and/or maintain one or more lists that include SMF information associated with SMFs that support a particular PDN-Type and SMFs that do not support a particular PDN-Type.

In this example, the AMF 130 may select SMF 150A. The AMF 130 may have initially selected one or more of SMF 150B or SMF 150C and determined that those SMFs are represented on the SMF list 460A. In response, the AMF 130 may have selected a subsequent SMF, and may repeatedly do so, until an SMF is selected this is not on the SMF list 460A or otherwise "blocked."

The AMF 130 may determine that the SMF 150A is not represented in the SMF list 460A. Because the SMF 150A is not represented in the SMF list 460A, the AMF 130 may transmit a session request 133A to the SMF 150A. The session request 133A may indicate the UE PDN-Type 420. The SMF 150A may determine, in response to the session request 133A, that it does not support the UE PDN-Type 420. For example, the SMF 150A may not recognize the indicated PDN-Type or it may recognize it and determine that it does not support the indicated PDN-Type. Therefore, in response, the SMF 150A may transmit a session response 134A to the AMF 130 indicating an error message 470 (e.g., "PDN-Type not supported" message or code, or other error code or failure message). In response to the session response 134A, the AMF 130 may determine that the SMF 150A does not support the UE PDN-Type 420.

In response to this determination, referring now to FIG. 4B, the AMF 130 may add the SMF 150A to the SMF list 460A to generate an updated SMF list 460B. The AMF 130 may again perform operations to determine an SMF to use for establishing a communications session for the UE 110.

In examples, following a failed session establishment, the AMF 130 may select another SMF from a set of SMFs provided by the NRF 140. The AMF 130 may then attempt to establish a session using that SMF if it is not included in a block list.

Alternatively or additionally, following a failed session establishment, the AMF 130 may transmit another SMF query 131B to the NRF 140 again requesting SMF data for one or more SMFs that service the area associated with the gNodeB TAC 430. The SMF query 131B may include the gNodeB TAC 430. The SMF query 131B may not indicate the UE PDN-Type 420.

The NRF 140 may respond with a subsequent SMF response 132B that may indicate the SMFs 150 that provide service to the area associated with the gNodeB TAC 430. This may include SMFs supporting and/or incompatible with a variety of PDN-Types. The AMF 130 may randomly select an SMF from among these SMFs. The AMF 130 may compare the selected SMF to those SMFs listed in an SMF list 460B. In this case, the AMF 130 may eliminate any of the SMF 150A, SMF 150B, and SMF 150C (if selected) as these SMFs are included in the SMF list 460B.

In this example, based on selecting an SMF from those remaining after the failed session establishment or selecting an SMF from those provided by a subsequent SMF query issued after the failed session establishment, the AMF 130 may select SMF 150E. The AMF 130 may determine that the SMF 150E is not represented in the SMF list 460B. Because the SMF 150E is not represented in the SMF list 460B, the AMF 130 may transmit a session request 133B to the SMF 150E. The session request 133B may indicate the UE PDN-Type 420. The SMF 150E may determine, in response to the session request 133B, that it supports the UE PDN-Type 420 and is configured to establish communications sessions for devices operating with the PDN-Type. In response, the SMF 150E may perform operations to establish a communications session for the UE 110 using the UE PDN-Type 420.

Based on successful establishment of the communications session for the UE 110 supporting the UE PDN-Type 420, the SMF 150E may transmit the session response 134B to the AMF 130. The session response 134B may include one or more indications of UPFs associated with the SMF 150E for use by the UE 110 and/or gNodeB 120 for user data. In this example, the SMF 150E may be associated with the UPF 160E, and therefore the session response 134B may include an indication of the UPF 160E. In examples, the session response 134B may also, or instead, include any one or more other UPFs and/or any other data that may be used by a gNodeB and/or a UE to communicate using the established communications session. Alternatively, if the SMF 150E was unable to establish the communications session, the session response 134B may include an error code, failure message, and/or any other data that may indicate to the AMF 130 that the session was not established.

Based on the session response 134B, the AMF 130 may transmit the network access response 122 to the gNodeB 120. The network access response 122 may include an indication of the UPF 160E. The gNodeB 120 may then transmit an access response 412 to the UE 110. The access response 412 may include an indication of the UPF 160E that the UE 110 may use to establish user data communications with the UPF 160E and exchange user data with one or more devices or networks via the UPF 160E. Alternatively or additionally, the gNodeB 120 may interact with the UPF 160E and exchange user data originating at and/or destined for the UE 110 with the UPF 160E.

Illustrative Operations

FIG. 5 shows a flow diagram of an illustrative process 500 for session management function selection according to the disclosed embodiments. The process 500 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 500 may be described with reference to the wireless network environment 100 of FIG. 1, however, other environments may also be used.

At operation 502, an AMF (e.g., AMF 130) may receive an access request (e.g., a request for access to a network using a particular protocol (e.g., PDN-Type) from a gNodeB (e.g., gNodeB 120). The access request may have originated at a user device (e.g., UE 110). The access request may include or indicate a TAC associated with the gNodeB and/or a PDN-Type associated with the originating user device.

At operation 504, the AMF may transmit a request (e.g., SMF query 131) for SMF data to an NRF (e.g., NRF 140). This request may include or indicate the gNodeB's TAC. This request may also include an explicit request for PDN-Type data for responsively provided SMFs. Alternatively, the NRF may be configured to provide PDN-Type data for SMFs when replying to such requests without requiring an explicit request for PDN-Type data.

At operation 506, the AMF may receive a response from the NRF that includes data representing one or more SMFs (e.g., one or more SMF addresses, hostnames, etc.). This data may further include one or more PDN-Types associated with one or more respective SMFs represented in the response data. The data received at operation 506 may represent a set of SMFs associated with the gNodeB's TAC and associated PDN-Type data.

At operation 508, the AMF may select an SMF for use in establishing a communications session for the UE associated with the access request received at operation 502. In examples, the AMF may determine a subset of the set of SMFs received at operation 506 that are associated with the PDN-Type associated with the originating user device. The AMF may then select (e.g., randomly) an SMF from this subset of SMFs that are associated with the PDN-Type associated with the originating user device. Alternatively, the AMF may select (e.g., randomly) an SMF from the set of SMFs received at operation 506 and then determine the PDN-Type for the selected SMF. If the PDN-Type for the selected SMF corresponds to (e.g., is the same as) the PDN-Type associated with the originating user device, the AMF may then proceed to operation 510 using the selected SMF. If the PDN-Type for the selected SMF does not correspond to (e.g., is different from) the PDN-Type associated with the originating user device, the AMF may select (e.g., randomly) another SMF from the (e.g., remaining) SMFs in the set of SMFs received at operation 506 and determine whether that subsequently selected SMF has a PDN-Type corresponding to the PDN-Type associated with the originating user device. If so, the AMF may use that subsequently selected SMF to perform session establishment operations at operation 510. If the subsequently selected SMF does not have a PDN-Type corresponding to the PDN-Type associated with the originating user device, the AMF may select yet another SMF from the remaining SMFs and check its PDN-Type against the PDN-Type associated with the originating user device, and so forth, until the AMF determines an SMF that corresponds to the PDN-Type associated with the originating user device.

At operation 510, using an SMF that corresponds to the PDN-Type associated with the originating user device as determined at operation 508, the AMF may perform one or more operations to establish a communications session for the originating user device. Such operations may include providing a UPF to the gNodeB for exchanging user data using the communications session.

FIG. 6 shows a flow diagram of an illustrative process 600 for session management function selection according to the disclosed embodiments. The process 600 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 600 may be described with reference to the wireless network environment 100 of FIG. 1, however, other environments may also be used.

At operation 602, an AMF (e.g., AMF 130) may receive an access request (e.g., a request for access to a network using a particular protocol (e.g., PDN-Type) from a gNodeB (e.g., gNodeB 120). The access request may have originated at a user device (e.g., UE 110). The access request may include or indicate a TAC associated with the gNodeB and/or a PDN-Type associated with the originating user device.

At operation 604, the AMF may transmit a request (e.g., SMF query 131) for SMF data to an NRF (e.g., NRF 140). This request may include or indicate the gNodeB's TAC. This request may also include an indication of the PDN-Type associated with the user device (e.g., as received at operation 602).

At operation 606, the AMF may receive a response from the NRF that includes data representing one or more SMFs (e.g., one or more SMF addresses, hostnames, etc.). This data may further include a PDN-Type associated with one or more respective SMFs represented in the response data, where the PDN-Type corresponds to the PDN-Type associated with the user device. Alternatively, the response data may not include the PDN-Type and it may be implicit that the SMF(s) provided in the response are associated with the PDN-Type indicated in the request transmitted at operation 604. The data received at operation 606 may represent a set of SMFs associated with the gNodeB's TAC and associated with the PDN-Type indicated in the request transmitted at operation 604 (e.g., the PDN-Type associated with the user device as received from the gNodeB at operation 602).

At operation 608, the AMF may select an SMF for use in establishing a communications session for the user device associated with the access request received at operation 602. In examples, the AMF may select (e.g., randomly) an SMF from the set of SMFs received at operation 606. Because SMFs received at operation 606 may be associated with the PDN-Type indicated in the request sent to the NRF at operation 604, any SMF selected from such SMFs may be configured to support the PDN-Type indicated in the request sent to the NRF (e.g., the PDN-Type associated with the user device as received from the gNodeB at operation 602).

At operation 610, using an SMF selected at operation 608 from the set of SMFs provided by the NRF at operation 606, the AMF may perform one or more operations to establish a communications session for the originating user device. Such operations may include providing a UPF to the gNodeB for exchanging user data using the communications session.

Figure 7:
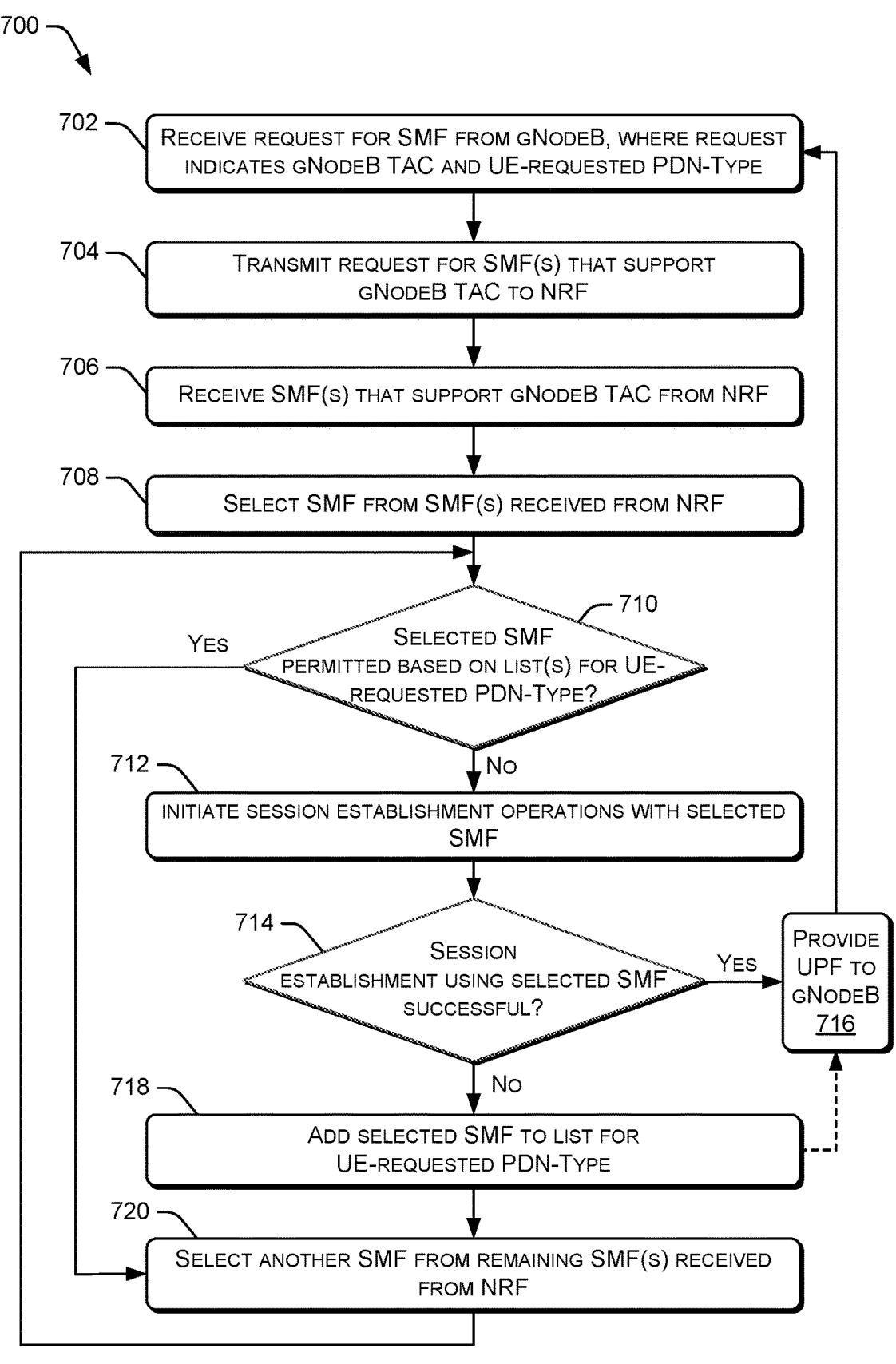
FIG. 7 is a flow diagram of an illustrative process for performing session management function selection and blocking, in accordance with examples of the disclosure.

FIG. 7 shows a flow diagram of an illustrative process 700 for session management function selection and blocking according to the disclosed embodiments. The process 700 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 700 may be described with reference to the wireless network environment 100 of FIG. 1, however, other environments may also be used.

At operation 702, an AMF (e.g., AMF 130) may receive an access request (e.g., a request for access to a network using a particular protocol (e.g., PDN-Type) from a gNodeB (e.g., gNodeB 120). The access request may have originated at a user device (e.g., UE 110). The access request may include or indicate a TAC associated with the gNodeB and/or a PDN-Type associated with the originating user device.

At operation 704, the AMF may transmit a request (e.g., SMF query 131) for SMF data to an NRF (e.g., NRF 140). This request may include or indicate the gNodeB's TAC. This request may not include an indication of the PDN-Type associated with the user device.

At operation 706, the AMF may receive a response from the NRF that includes data representing one or more SMFs (e.g., one or more SMF addresses, hostnames, etc.) that may be associated with the gNodeB's TAC as indicated in the request transmitted at operation 704. The data received at operation 706 may represent a set of SMFs associated with the gNodeB's TAC.

At operation 708, the AMF may select an SMF for use in establishing a communications session for the user device associated with the access request received at operation 702. In examples, the AMF may select (e.g., randomly) an SMF from the set of SMFs received at operation 706.

At operation 710, the AMF may determine whether the selected SMF is included in a list of blocked and/or permitted SMFs for the PDN-Type associated with the originating user device (e.g., as indicated in the request received at 702). For example, at operation 710, the AMF may determine whether the selected SMF is included in a block list for the PDN-Type associated with the originating user device, where the AMF is configured to exclude SMFs included in such a block list from use in establishing communications session using that PDN-Type. If the selected SMF is included in a block list for the PDN-Type indicated in the request received at 702, the process 700 may proceed to operation 720, where the AMF may select (e.g., randomly) another SMF from the (e.g., remaining) SMFs received at operation 706. The AMF may return to operation 710 to evaluate this subsequently selected SMF against the block list. These operations may be iteratively performed until an SMF is selected that is not excluded from use in session establishment using the PDN-Type based on the block list.

Alternatively or additionally, at operation 710, the AMF may determine whether the selected SMF is included in a permit list for the PDN-Type associated with the originating user device, where the AMF is configured to use (e.g., only) SMFs included in such a permit list in establishing communications session using that PDN-Type. If the selected SMF is not included in a permit list for the PDN-Type indicated in the request received at operation 702, the process 700 may proceed to operation 720, where the AMF may select (e.g., randomly) another SMF from the (e.g., remaining) SMFs received at operation 706. The AMF may return to operation 710 to evaluate this subsequently selected SMF against the permit list. These operations may be iteratively performed until an SMF is selected that is permitted for use in session establishment using the PDN-Type based on the block list.

Once an SMF is determined that is not excluded by a block list and/or that is included in a permit list at operation 710, at operation 712 the AMF may initiate one or more communication session establishment operations with the determined SMF. For example, the AMF may send a request to establish a communications session for the user device associated with the request received at operation 702 and using the PDN-Type indicated in the request received at operation 702.

At operation 714, the AMF may determine whether the session establishment operation(s) initiated at operation 712 were successful. If so, at operation 716, the AMF may provide data indicating one or more UPFs and/or any other type of session data to the gNodeB from which the request was received at operation 702. This data may be used by the gNodeB and/or the user device associated with the request received at operation 702 to exchange user data with one or more other devices and/or networks.

If, at operation 714, the AMF determines that the session establishment operation(s) initiated at operation 712 were unsuccessful, for example based on a message from the SMF that it does not support the PDN-Type associated with the user device (e.g., the PDN-Type indicated in the request received at operation 702), at operation 718, the AMF may add the SMF to a block list associated with that PDN-Type. This will prevent the AMF from attempting to establish a communications session using that PDN-Type in the future, avoiding the unnecessary processing of session establishment requests that cannot ultimately be fulfilled. The AMF may then proceed to select another SMF at operation 720. In examples, the AMF may select (e.g., randomly) an SMF from the (e.g., remaining) set of SMFs initially received at operation 706. Alternatively, the AMF may return to operation 704 and request another set of SMFs from which to select a subsequent SMF to use for session establishment (e.g., after determining such an SMF is not blocked and/or is permitted based on one or more SMF lists as described above).

Alternatively or additionally, if, at operation 714, the AMF determines that the session establishment operation(s) initiated at operation 712 were successful, for example based on a message from the SMF that includes or indicates a UPF that supports the PDN-Type associated with the user device (e.g., the PDN-Type indicated in the request received at operation 702), at operation 718, the AMF may add the SMF to a permit list associated with that PDN-Type. This will allow the AMF to use that SMF to establish communications sessions using that PDN-Type in the future. The AMF may then, at operation 716, provide data indicating one or more UPFs and/or any other type of session data to the gNodeB from which the request was received at operation 702. This data may be used by the gNodeB and/or the user device associated with the request received at operation 702 to exchange user data with one or more other devices and/or networks.

Note that any of the operations performed in the processes 500, 600, and 700 may be combined, along with any other operations of functions described herein. For example, an AMF may receive SMF data from an NRF that indicates (explicitly (e.g., operation 506 of process 500) and/or implicitly (e.g., operation 606 of process 600)) the PDN-Type(s) supported by particular SMFs. The AMF may use this information to update one or more SMF lists (e.g., operation 718 of process 700). For example, an AMF may add SMFs to a block list that it learns from an NRF do not support the PDN-Type associated with that list. Similarly, an AMF may add SMFs to a permit list that it learns from an NRF support the PDN-Type associated with that list. Any other combinations of operations are contemplated as within the scope of the instant disclosure.

In summary, by more efficiently selecting compatible session management functions and selectively avoiding session management functions that are not configured to support a protocol used by the user device for which a communications session has been requested, the disclosed systems and techniques may be able to increase the efficiency of usage of core network resources and other wireless network resources and improve the performance of both the network and user devices.

Example User Equipment

Figure 8:
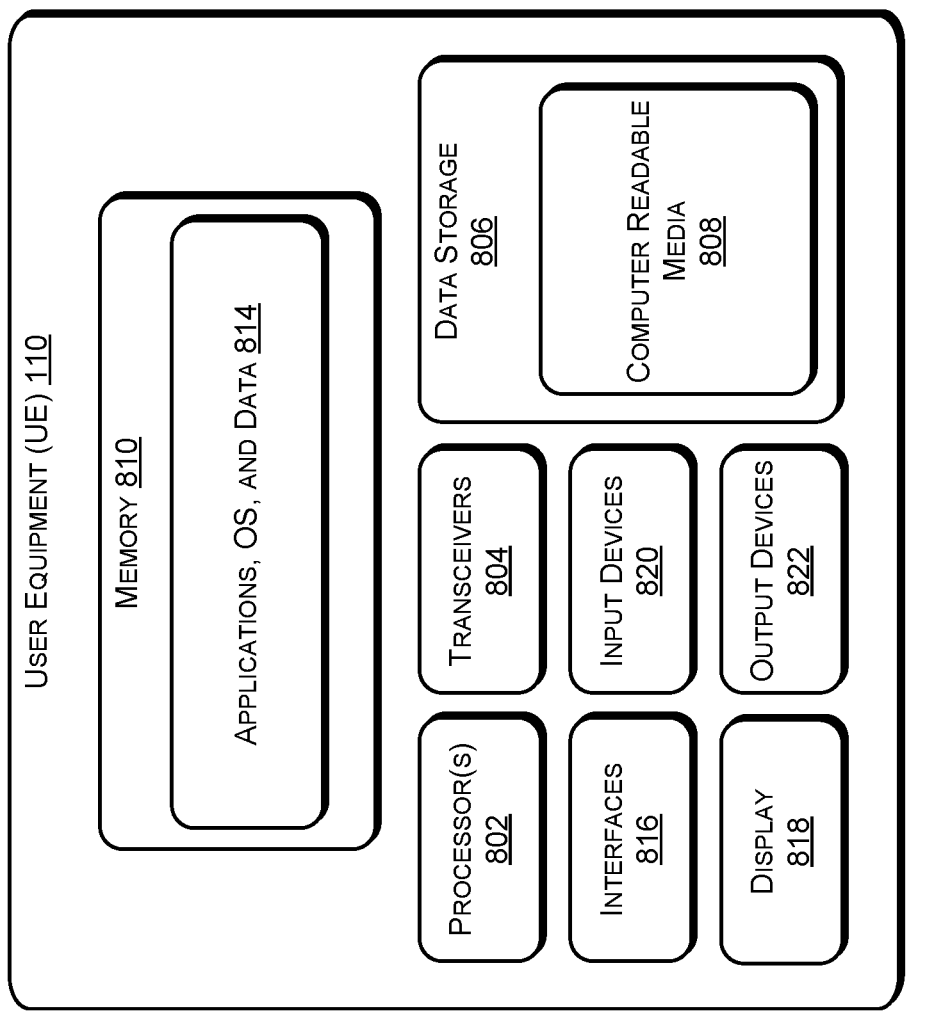
FIG. 8 is a schematic diagram of illustrative components in an example user device that is configured for interacting with a wireless communications network that implements session management function selection and blocking, in accordance with examples of the disclosure.

FIG. 8 is an example of a UE, such as UE 110, for use with the systems and methods disclosed herein, in accordance with some examples of the present disclosure. The UE 110 may include one or more processors 802, one or more transmit/receive antennas (e.g., transceivers or transceiver antennas) 804, and a data storage 806. The data storage 806 may include a computer-readable media 808 in the form of memory and/or cache. This computer-readable media may include a non-transitory computer-readable media. The processor(s) 802 may be configured to execute instructions, which can be stored in the computer-readable media 808 and/or in other computer-readable media accessible to the processor(s) 802. In some configurations, the processor(s) 802 is a Central Processing Unit (CPU), a Graphics Processing Unit (GPU), or both CPU and GPU, or any other sort of processing unit. The transceiver antenna(s) 804 can exchange signals with a base station, such as gNodeB 120.

The UE 110 may be configured with a memory 810. The memory 810 may be implemented within, or separate from, the data storage 806 and/or the computer-readable media 808. The memory 810 may include any available physical media accessible by a computing device to implement the instructions stored thereon. For example, the memory 810 may include, but is not limited to, RAM, ROM, EEPROM, a SIM card, flash memory or other memory technology, CD-ROM, DVD or other optical disk storage, magnetic cassettes, magnetic tape, magnetic disk storage or other magnetic storage devices, or any other medium which may be used to store the desired information and which may be accessed by the UE 110.

The memory 810 can store several modules, such as instructions, data stores, and so forth that are configured to execute on the processor(s) 802. In configurations, the memory 810 may also store one or more applications 814 configured to receive and/or provide voice, data and messages (e.g., SMS messages, Multi-Media Message Service (MMS) messages, Instant Messaging (IM) messages, Enhanced Message Service (EMS) messages, etc.) to and/or from another device or component (e.g., the gNodeB 120). The applications 814 may also include one or more operating systems and/or one or more third-party applications that provide additional functionality to the UE 110. The memory may also, or instead, store bandwidth information, such as UE-supported bands, bandwidth(s) and bandwidth parts, as well as communications session information such as UE-specific carrier bandwidth(s). The memory may also, or instead, store permit list and/or block list information, PDN-Type information, SMF information, UPF information, NRF information, etc.

Although not all illustrated in FIG. 8, the UE 110 may also comprise various other components, e.g., a battery, a charging unit, one or more network interfaces 816, an audio interface, a display 818, a keypad or keyboard, and one or more input devices 820, and one or more output devices 822.

Example Computing Device

Figure 9:
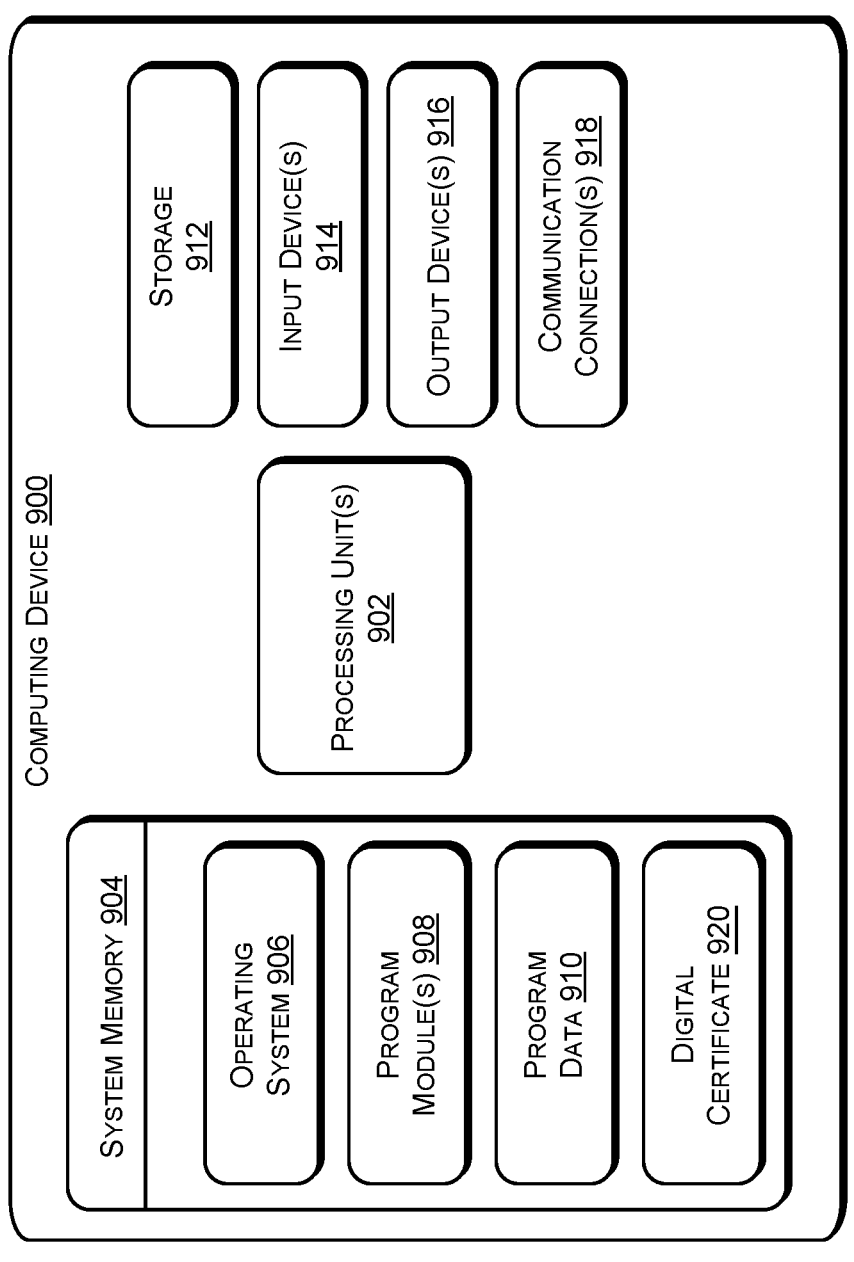
FIG. 9 is a schematic diagram of illustrative components in an example computing device that is configured for performing one or more aspects of session management function selection and blocking, in accordance with examples of the disclosure.

FIG. 9 is an example of a computing device 900 for use with the systems and methods disclosed herein, in accordance with some examples of the present disclosure. The computing device 900 can be used to implement various components of a core network, a base station (e.g., gNodeB 120, AMF 130, NRF 140, any of SMFs 150), and/or any servers, routers, gateways, gateway elements, administrative components, etc. that can be used by a communication provider. One or more computing devices 900 can be used to implement the core network 101, for example. One or more computing devices 900 can also be used to implement base stations and other components.

In various embodiments, the computing device 900 can include one or more processing units 902 and system memory 904. Depending on the exact configuration and type of computing device, the system memory 904 can be volatile (such as RAM), non-volatile (such as ROM, flash memory, etc.) or some combination of the two. The system memory 904 can include an operating system 906, one or more program modules 908, program data 910, and one or more digital certificates 920. The system memory 904 may be secure storage or at least a portion of the system memory 904 can include secure storage. The secure storage can prevent unauthorized access to data stored in the secure storage. For example, data stored in the secure storage can be encrypted or accessed via a security key and/or password.

The computing device 900 can also include additional data storage devices (removable and/or non-removable) such as, for example, magnetic disks, optical disks, or tape. Such additional storage is illustrated in FIG. 9 by storage 912.

The computing device 900 may store, in either or both of the system memory 904 and the storage 912, block list information, permit list information, associated functions, timer information and/or timestamps, message transfer data, PDU session information, SMF data, etc.

Non-transitory computer storage media of the computing device 900 can include volatile and nonvolatile, removable and non-removable media implemented in any method or technology for storage of information, such as computer-readable instructions, data structures, program modules, or other data. The system memory 904 and storage 912 are examples of computer-readable storage media. Non-transitory computer-readable storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by computing device 900. Any such non-transitory computer-readable storage media can be part of the computing device 900.

In various embodiments, any or all of the system memory 904 and storage 912 can store programming instructions which, when executed, implement some or all of the functionality described above as being implemented by one or more systems configured in the environment 100 and/or components of the network 101.

The computing device 900 can also have one or more input devices 914 such as a keyboard, a mouse, a touch-sensitive display, voice input device, etc. The computing device 900 can also have one or more output devices 916 such as a display, speakers, a printer, etc. can also be included. The computing device 900 can also contain one or more communication connections 918 that allow the device to communicate with other computing devices using wired and/or wireless communications.

Example Clauses

The following paragraphs describe various examples. Any of the examples in this section may be used with any other of the examples in this section and/or any of the other examples or embodiments described herein.

A: A method performed by a one or more computing devices configured in a wireless communications network, the method comprising: receiving, at access management function from a base station, a network access request comprising a tracking area code associated with the base station and a packet data network type associated with a user equipment (UE); transmitting, from the access management function to a repository function, a session management function data request comprising the tracking area code; receiving, at the access management function from the repository function, session management function data representing a plurality of session management functions; determining, at the access management function, a session management function from among the plurality of session management functions; comparing, at the access management function, the session management function to one or more lists of session management functions associated with the packet data network type; and initiating, at the access management function and based at least in part on comparing the session management function to the one or more lists of session management functions, establishment of a communications session in the wireless communications network for the UE.

B: The method of paragraph A, wherein: comparing the session management function to the one or more lists of session management functions comprises determining that the session management function is not represented in a block list of the one or more lists of session management functions; and initiating the establishment of the communications session is further based at least in part on determining that the session management function is not represented in the block list.

C: The method of paragraph A or B, wherein: comparing the session management function to the one or more lists of session management functions comprises determining that the session management function is represented in a permit list of the one or more lists of session management functions; and initiating the establishment of the communications session is further based at least in part on determining that the session management function is represented in the permit list.

D: The method of any of paragraphs A-C, wherein: comparing the session management function to the one or more lists of session management functions comprises: determining that the session management function is represented in a block list of the one or more lists of session management functions; and based at least in part on determining that the session management function is represented in the block list, determining a second session management function from among the plurality of session management functions; and initiating the establishment of the communications session comprises using the second session management function to initiate the establishment of the communications session.

E: The method of any of paragraphs A-D, wherein: initiating the establishment of the communications session comprises using the session management function to initiate the establishment of the communications session; and the method further comprising: receiving an unsupported packet data network message from the session management function; and updating a block list of the one or more lists of session management functions to include an indication of the session management function.

F: The method of any of paragraphs A-C, wherein: initiating the establishment of the communications session comprises using the session management function to initiate the establishment of the communications session; and the method further comprising: receiving communications session established message from the session management function; and updating a permit list of the one or more lists of session management functions to include an indication of the session management function.

G: A network computing device configured at a wireless communications network, the network computing device comprising: one or more processors; one or more transceivers; and non-transitory computer-readable media storing computer-executable instructions that, when executed by the one or more processors, cause the one or more processors to perform operations comprising: receiving a network access request from a base station, the network access request comprising a tracking area code associated with the base station and a packet data network type associated with a user equipment (UE); obtaining session management function data associated with the tracking area code from a repository function, the session management function data representing a plurality of session management functions; determining a session management function from among the plurality of session management functions based at least in part on the packet data network type; and establishing a communications session in the wireless communications network for the UE using the session management function.

H: The network computing device of paragraph G, wherein obtaining session management function data comprises: transmitting session management function data request comprising the packet data network type to the repository function; and receiving the session management function data from the repository function, wherein individual session management functions of the plurality of session management functions support the packet data network type.

I: The network computing device of paragraph G or H, wherein the session management function data comprises indications of supported packet data network types for individual session management functions of the plurality of session management functions.

J: The network computing device of paragraph I, wherein determining the session management function comprises determining that a supported packet data network type for the session management function corresponds to the packet data network type.

K: The network computing device of paragraph J, wherein the supported packet data network type comprises one or more of Internet Protocol version 6 (IPv6) or Internet Protocol version 4 and version 6 (IPv4v6).

L: The network computing device of any of paragraphs G-K, wherein the packet data network type comprises one or more of Internet Protocol version 4 (IPv4) or Internet Protocol version 6 (IPv6).

M: The network computing device of any of paragraphs G-L, wherein establishing the communications session comprises: receiving an indication of a user plane function from the session management function; and transmitting the indication of the user plane function to the base station.

N: The network computing device of any of paragraphs G-M, wherein determining the session management function comprises at least one of: determining that the session management function is not represented in a block list associated with the packet data network type; and determining that the session management function is represented in a permit list associated with the packet data network type.

O: A non-transitory computer-readable media storing computer-executable instructions that, when executed by one or more processors, cause the one or more processors to perform operations comprising: receiving a network access request from a base station, the network access request comprising a tracking area code associated with the base station and a packet data network type associated with a user equipment (UE); determining session management function data associated with the tracking area code using a repository function, the session management function data representing a plurality of session management functions; determining a session management function from among the plurality of session management functions based at least in part on the packet data network type; and initiating establishment of a communications session in a wireless communications network for the UE using the session management function.

P: The non-transitory computer-readable media of paragraph O, wherein the operations further comprise: receiving an unsupported packet data network type message from the session management function; and updating a block list associated with the packet data network type with an indication of the session management function.

Q: The non-transitory computer-readable media of paragraph P, wherein the operations further comprise: based at least in part on receiving the unsupported packet data network type message, determining a second session management function from among the plurality of session management functions; determining that the second session management function is not represented in the block list; and initiating the establishment of the communications session in the wireless communications network for the UE using the second session management function.

R: The non-transitory computer-readable media of any of paragraphs O-Q, wherein: determining the session management function data comprises obtaining supported packet data network types for individual session management functions of the plurality of session management functions from the repository function; and determining the session management function from among the plurality of session management functions comprises determining that a supported packet data network type for the session management function corresponds to the packet data network type.

S: The non-transitory computer-readable media of any of paragraphs O-R, wherein determining the session management function data comprises: transmitting the packet data network type to the repository function; and receiving the session management function data from the repository function, wherein individual session management functions of the plurality of session management functions are configured to support the packet data network type.

T: The non-transitory computer-readable media of any of paragraphs O-S, wherein the packet data network type comprises one or more of Internet Protocol version 4 (IPv4) or Internet Protocol version 6 (IPv6).

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A-T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a one or more computing devices configured in a wireless communications network, the method comprising:

receiving, at access management function from a base station, a network access request comprising a tracking area code associated with the base station and a packet data network type associated with a user equipment (UE);

transmitting, from the access management function to a repository function, a session management function data request comprising the tracking area code;

receiving, at the access management function from the repository function, session management function data representing a plurality of session management functions;

determining, at the access management function, a session management function from among the plurality of session management functions;

comparing, at the access management function, the session management function to one or more lists of session management functions associated with the packet data network type, wherein the one or more lists of session management functions includes at least one of permit list maintained by the access management function to allow session management functions that support the packet data network type or a block list maintained by the access management function to block session management functions that do not support the packet data network type; and initiating, at the access management function and based at least in part on comparing the session management function to the one or more lists of session management functions, establishment of a communications session in the wireless communications network for the UE.

2. The method of claim 1, wherein:

comparing the session management function to the one or more lists of session management functions comprises determining that the session management function is not represented in the block list of the one or more lists of session management functions; and initiating the establishment of the communications session is further based at least in part on determining that the session management function is not represented in the block list.

3. The method of claim 1, wherein:

comparing the session management function to the one or more lists of session management functions comprises determining that the session management function is represented in the permit list of the one or more lists of session management functions; and initiating the establishment of the communications session is further based at least in part on determining that the session management function is represented in the permit list.

4. The method of claim 1, wherein:

comparing the session management function to the one or more lists of session management functions comprises:

determining that the session management function is represented in the block list of the one or more lists of session management functions; and based at least in part on determining that the session management function is represented in the block list, determining a second session management function from among the plurality of session management functions; and initiating the establishment of the communications session comprises using the second session management function to initiate the establishment of the communications session.

5. The method of claim 1, wherein:

initiating the establishment of the communications session comprises using the session management function to initiate the establishment of the communications session; and the method further comprising:

receiving an unsupported packet data network message from the session management function; and updating the block list of the one or more lists of session management functions to include an indication of the session management function.

6. The method of claim 1, wherein:

initiating the establishment of the communications session comprises using the session management function to initiate the establishment of the communications session; and the method further comprising:

receiving communications session established message from the session management function; and updating the permit list of the one or more lists of session management functions to include an indication of the session management function.

7. A network computing device configured at a wireless communications network, the network computing device comprising:

one or more processors;

one or more transceivers; and non-transitory computer-readable media storing computer-executable instructions that, when executed by the one or more processors, cause the one or more processors to perform operations comprising:

receiving a network access request from a base station, the network access request comprising a tracking area code associated with the base station and a packet data network type associated with a user equipment (UE);

obtaining session management function data associated with the tracking area code from a repository function, the session management function data representing a plurality of session management functions;

determining a session management function from among the plurality of session management functions based at least in part on the packet data network type, wherein the determining includes comparing one or more of the session management functions from the plurality of session management functions to one or more lists of session management functions, wherein the one or more lists of session management functions includes at least one of a permit list maintained by the network computing device to allow session management functions that support the packet data network type or a block list maintained by the network computing device to block session management functions that do not support the packet data network type; and establishing a communications session in the wireless communications network for the UE using the session management function.

8. The network computing device of claim 7, wherein obtaining session management function data comprises:

transmitting session management function data request comprising the packet data network type to the repository function; and receiving the session management function data from the repository function, wherein individual session management functions of the plurality of session management functions support the packet data network type.

9. The network computing device of claim 7, wherein the session management function data comprises indications of supported packet data network types for individual session management functions of the plurality of session management functions.

10. The network computing device of claim 9, wherein determining the session management function comprises determining that a supported packet data network type for the session management function corresponds to the packet data network type.

11. The network computing device of claim 10, wherein the supported packet data network type comprises one or more of Internet Protocol version 6 (IPv6) or Internet Protocol version 4 and version 6 (IPv4v6).

12. The network computing device of claim 7, wherein the packet data network type comprises one or more of Internet Protocol version 4 (IPv4) or Internet Protocol version 6 (IPv6).

13. The network computing device of claim 7, wherein establishing the communications session comprises:

receiving an indication of a user plane function from the session management function; and transmitting the indication of the user plane function to the base station.

14. The network computing device of claim 7, wherein determining the session management function comprises at least one of:

determining that the session management function is not represented in the block list associated with the packet data network type; and determining that the session management function is represented in the permit list associated with the packet data network type.

15. A non-transitory computer-readable media storing computer-executable instructions that, when executed by one or more processors of an access management function, cause the access management function to perform operations comprising:

receiving a network access request from a base station, the network access request comprising a tracking area code associated with the base station and a packet data network type associated with a user equipment (UE);

determining session management function data associated with the tracking area code using a repository function, the session management function data representing a plurality of session management functions;

determining a session management function from among the plurality of session management functions based at least in part on the packet data network type, wherein the determining includes comparing one or more of the session management functions from the plurality of session management functions to one or more lists of session management functions, wherein the one or more lists of session management functions includes at least one of a permit list maintained by the network computing device to allow session management functions that support the packet data network type or a block list maintained by the network computing device to block session management functions that do not support the packet data network type; and initiating establishment of a communications session in a wireless communications network for the UE using the session management function.

16. The non-transitory computer-readable media of claim 15, wherein the operations further comprise:

receiving an unsupported packet data network type message from the session management function; and updating the block list associated with the packet data network type with an indication of the session management function.

17. The non-transitory computer-readable media of claim 16, wherein the operations further comprise:

based at least in part on receiving the unsupported packet data network type message, determining a second session management function from among the plurality of session management functions;

determining that the second session management function is not represented in the block list; and initiating the establishment of the communications session in the wireless communications network for the UE using the second session management function.

18. The non-transitory computer-readable media of claim 15, wherein:

determining the session management function data comprises obtaining supported packet data network types for individual session management functions of the plurality of session management functions from the repository function; and determining the session management function from among the plurality of session management functions comprises determining that a supported packet data network type for the session management function corresponds to the packet data network type.

19. The non-transitory computer-readable media of claim 15, wherein determining the session management function data comprises:

transmitting the packet data network type to the repository function; and receiving the session management function data from the repository function, wherein individual session management functions of the plurality of session management functions are configured to support the packet data network type.

20. The non-transitory computer-readable media of claim 15, wherein the packet data network type comprises one or more of Internet Protocol version 4 (IPv4) or Internet Protocol version 6 (IPv6).

* * * * *